United States Patent
Yin et al.

(10) Patent No.: US 12,127,096 B2
(45) Date of Patent: Oct. 22, 2024

(54) METHOD FOR PERFORMING ACCESS CONTROL ON USER EQUIPMENT, NETWORK SYSTEM, AND RELATED DEVICE

(71) Applicant: HUAWEI TECHNOLOGIES CO., LTD., Guangdong (CN)

(72) Inventors: Yu Yin, Shanghai (CN); Caixia Qi, Shanghai (CN); Zhenyu Tao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/586,140

(22) Filed: Jan. 27, 2022

(65) Prior Publication Data

US 2022/0150797 A1    May 12, 2022

Related U.S. Application Data

(63) Continuation of application No. PCT/CN2020/097542, filed on Jun. 22, 2020.

(30) Foreign Application Priority Data

Aug. 2, 2019  (CN) .......................... 201910713959.2

(51) Int. Cl.
*H04W 48/02*    (2009.01)
(52) U.S. Cl.
CPC .................................. *H04W 48/02* (2013.01)
(58) Field of Classification Search
CPC ....... H04W 48/02; H04W 8/20; H04W 60/04; H04W 88/18; H04W 8/24; H04W 24/08;
(Continued)

(56) References Cited

U.S. PATENT DOCUMENTS

| | | | |
|---|---|---|---|
| 2013/0028172 A1* | 1/2013 | Lim ...................... | H04W 36/12 370/315 |
| 2016/0183148 A1* | 6/2016 | Worrall ................. | H04W 76/15 370/235 |

(Continued)

FOREIGN PATENT DOCUMENTS

| | | | |
|---|---|---|---|
| CN | 105557035 A | | 5/2016 |
| CN | 109891962 A | | 6/2019 |

(Continued)

OTHER PUBLICATIONS

NTT Docomo et al.,"Procedures for Dual Connectivity",SA WG2 Meeting #122 S2-174985,San Jose del Cabo, Mexico, Jun. 26-30, 2017,Total 10 Pages.

(Continued)

*Primary Examiner* — Abdullahi Ahmed
(74) *Attorney, Agent, or Firm* — HUAWEI TECHNOLOGIES CO., LTD.

(57) ABSTRACT

In a method for performing access control on user equipment, a mobility management device receives from an access node device an access type parameter of the user equipment. The access type parameter indicates a radio access type of the user equipment or a type of the access node device. The mobility management device determines, based on the access type parameter, a connection type of the user equipment in accessing a core network, wherein the connection type is either single connectivity or dual connectivity. The mobility management device then performs access control on the user equipment based on the connection type of the user equipment.

21 Claims, 11 Drawing Sheets

(58) Field of Classification Search
CPC ....... H04W 76/15; H04W 4/24; H04W 76/10; H04W 24/10; H04L 12/1407; H04M 15/66; H04M 15/8016; H04M 15/8228
See application file for complete search history.

(56) References Cited

U.S. PATENT DOCUMENTS

| | | |
|---|---|---|
| 2017/0071023 A1 | 3/2017 | Kunz et al. |
| 2017/0078940 A1* | 3/2017 | Zhang ................ H04W 12/041 |
| 2019/0174009 A1* | 6/2019 | Tamura ............... H04W 76/00 |
| 2021/0120610 A1* | 4/2021 | Zhu ..................... H04W 36/08 |
| 2022/0109584 A1* | 4/2022 | Gunasekaran ........ H04M 15/62 |
| 2022/0194493 A1* | 6/2022 | Chandramouli ....... B62D 37/06 |
| 2024/0098734 A1* | 3/2024 | Park ....................... H04W 8/24 |

FOREIGN PATENT DOCUMENTS

| | | |
|---|---|---|
| WO | 2015133144 A1 | 9/2015 |
| WO | 2017189043 A1 | 11/2017 |
| WO | 2018172408 A1 | 9/2018 |
| WO | 2018231007 A1 | 12/2018 |

OTHER PUBLICATIONS

Samsung,"Support of CSG, LIPA, and SIPTO@LN functions for dual connectivity",3GPP TSG-SA WG2 Meeting #113 S2-160107,Frigatebay, Saint Kitts and Nevis, Jan. 25-29, 2016,Total 4 Pages.
TR 21.915 V1.0.0 (Mar. 2019)3rd Generation Partnership Project;Technical Specification Group Services and System Aspects;Release 15 Description;Summary of Rel-15 Work Items(Release 15),Total 112 Pages.

* cited by examiner

METHOD FOR PERFORMING ACCESS CONTROL ON USER EQUIPMENT, NETWORK SYSTEM, AND RELATED DEVICE

CROSS-REFERENCE TO RELATED APPLICATIONS

This application is a continuation of International Application No. PCT/CN2020/097542, filed on Jun. 22, 2020, which claims priority to Chinese Patent Application No. 201910713959.2, filed on Aug. 2, 2019. The disclosures of the aforementioned applications are hereby incorporated by reference in their entirety.

TECHNICAL FIELD

The present invention relates to the field of communications technologies, and in particular, to a method for performing access control on user equipment, a network system, and a related device.

BACKGROUND

A mobile communications network supports a non-standalone networking architecture. In the non-standalone networking architecture, user equipment may simultaneously establish connections to two access nodes. Service data of the user equipment may be forwarded through either or both of the two access nodes. In the non-standalone networking architecture, the user equipment may alternatively establish a connection to only one access node.

When the user equipment establishes connections to two access nodes, the user equipment may be referred to as dual-connectivity user equipment, and a connection type of the user equipment is dual connectivity. When the user equipment establishes a connection to only one access node, the user equipment may be referred to as single-connectivity user equipment, and a connection type of the user equipment is single connectivity.

In a current mobile communications network, there is no technical solution for identifying a connection type of user equipment, and access control cannot be performed on the user equipment.

SUMMARY

A technical problem to be resolved in embodiments of the present invention is to provide a method for performing access control on user equipment, a network system, and a related product, to identify a connection type of the user equipment and provide support for a targeted service.

According to a first aspect, an embodiment of the present invention provides a method for performing access control on user equipment. The method includes:

a mobility management device identifies a connection type used by the user equipment to access a core network through an access node device, where the connection type is single connectivity or dual connectivity; and when the connection type is the single connectivity, the user equipment accesses the core network through one access node device; or when the connection type is the dual connectivity, the user equipment accesses the core network through two access node devices; and the mobility management device performs access control on the user equipment based on the connection type of the user equipment.

This embodiment may be applied to a mobile communications network in non-standalone networking or standalone networking. The access node device may be referred to as an access node, for example, a base station in a fourth generation (4G) network or a fifth generation (5G) network. One user equipment may access two base stations, for example, a primary access node and a secondary access node. The mobility management device may be a mobility management entity (mobility management entity, MME) or an access and mobility management function (access and mobility management function, AMF) device.

In this embodiment, the performing, by the mobility management device, access control on the user equipment may be: When determining, based on the connection type, that the user equipment has a dual-connectivity capability or has been subscribed to the dual connectivity, if the user equipment currently uses the single connectivity, the mobility management device performs access control on the user equipment, so that the user equipment cannot use service data; or the mobility management device performs different permission control separately on single-connectivity user equipment or multi-connectivity user equipment. A specific process is not uniquely limited in this embodiment of the present invention.

Because one user equipment may be corresponding to one mobility management device, and may be corresponding to a plurality of gateway devices or network devices thereof, in this embodiment, an identification function may be aggregated in a fixed device by the mobility management device by identifying the connection type of the user equipment. In addition, the mobility management device is a core network device that the user equipment first accesses through the access node device. Therefore, if a targeted service, for example, access control, is performed on the mobility management device, this is more promptly and has a shorter delay in comparison with a case in which the mobility management device is notified after another device identifies the connection type of the user equipment.

In a possible implementation, that a mobility management device identifies a connection type used by user equipment to access a core network through an access node device includes:

the mobility management device receives an access type parameter that is of the user equipment and that is sent by the access node device, where the access type parameter is used to indicate a radio access type of the user equipment or a type of the access node device; and the mobility management device determines the connection type of the user equipment based on the access type parameter;

the mobility management device determines the connection type of the user equipment based on one or more of a dual-connectivity capability of the user equipment, subscription information of the user equipment, or a local configuration of the mobility management device;

the mobility management device receives a data usage report sent by the access node device, where the data usage report includes traffic information of the user equipment; and the mobility management device determines the connection type of the user equipment based on the data usage report; or the mobility management device receives a message carrying an internet protocol (internet protocol, IP) address of the access node device, and the mobility management device determines the connection type of the user equipment based on the IP address of the access node device.

In this embodiment, a plurality of optional methods are provided, and the mobility management device determines the connection type of the user equipment.

In a first method, the access node device sends the access type parameter to the mobility management device through a message, and the mobility management device determines the connection type of the user equipment based on the access type parameter. The message carrying the access type parameter may be a message used in a procedure of establishing, updating, or deleting a bearer related to the user equipment. For example, a radio access bearer update request message, or a dedicated message may be used to carry the access type parameter. This is not uniquely limited in this embodiment. In addition, a specific means for indicating the radio access type of the user equipment or the type of the access node device by using the access type parameter may be direct indication, or may be obtained through determining by using a parameter that can be identified by the mobility management device. A specific form is not uniquely limited in this embodiment of the present invention. In the first method, the mobility management device may directly obtain the connection type of the user equipment from carried information, and this is relatively more efficient.

In a second method, a parameter required for determining the connection type is mainly obtained by the mobility management device, and then the mobility management device determines the connection type of the user equipment based on the parameter. The dual-connectivity capability of the user equipment may be reported by the user equipment during network registration. Subscription information of a user may also carry information about whether the user equipment is allowed to use the dual connectivity, and the mobility management device may obtain the information from a device, for example, a home subscriber server, that stores the subscription information. The local configuration of the mobility management device may also include the information about whether the user equipment is allowed to use the dual connectivity. The mobility management device may determine the connection type based on one or more of the dual-connectivity capability of the user equipment, the subscription information of the user, the local configuration, and the like. In the second method, compared with the foregoing first method, the mobility management device may indirectly obtain a relatively accurate connection type of the user equipment, so that signaling usage and data transmission can be further reduced.

A third method is mainly determined by an effect that is of the single connectivity or dual connectivity that is on the data usage report. In a fourth method, types of different access node devices, such as a first base station or a second base station, are distinguished through IP addresses. The first base station may be a 4G base station, and the second base station may be a 5G base station. Alternatively, both the first base station and the second base station may be 5G base stations. In this way, the connection type of the user equipment is determined. In a non-standalone networking scenario based on a 4G core network, a first base station and a second base station that are accessed by dual-connectivity user equipment are respectively a 4G base station and a 5G base station. In a networking scenario based on a 5G core network, a first base station and a second base station that are accessed by dual-connectivity user equipment are both 5G base stations. The third method provides an implementation means of intelligently identifying the connection type of the user equipment by the mobility management device, and does not need to depend on existing or transmitted data that is used to identify the connection type of the user equipment.

In a possible implementation, the primary access node (or referred to as a first access node or a primary access node device), eNodeB, and a 4G base station are collectively referred to as the first base station. The secondary access node (a second access node or a secondary access node device), a next generation NodeB (next generation NodeB, gNB), an evolved NodeB (evolved NodeB, eNB), and a 5G base station are collectively referred to as the second base station.

In a possible implementation, the receiving, by the mobility management device, an access type parameter that is of the user equipment and that is sent by the access node device; and determining, by the mobility management device, the connection type of the user equipment based on the access type parameter specifically includes:

the mobility management device receives a radio access bearer update request message, a channel handover request message, or a service flow notification message sent by the access node device, where the radio access bearer update request message, the channel handover request message, or the service flow notification message includes the access type parameter; and the mobility management device determines the connection type of the user equipment based on the access type parameter.

This embodiment provides several specific message examples that may be used to carry the access type parameter. When the message in the foregoing example is used to carry the access type parameter, there may be no need to add new signaling, and the message has good compatibility with an existing procedure.

In a possible implementation, that the mobility management device receives a message carrying an internet protocol IP address of the access node device, and the mobility management device determines the connection type of the user equipment based on the IP address of the access node device includes:

the mobility management device receives an initial context setup response message, a packet data unit (PDU) session resource setup response message, or a default bearer setup response message, and carries the IP address of the access node device in the initial context setup response message, the PDU session resource setup response message, or the default bearer setup response message; and the mobility management device determines the connection type of the user equipment based on the IP address of the access node device.

This embodiment provides several examples of specific messages in which the access node device sends the access type parameter to the mobility management device. It may be understood that when the access type parameter is carried in another message, or the access type parameter is sent by using the dedicated message, implementation of this embodiment of the present invention is not affected. When the foregoing message is used, there may be no need to add a new message type. The access type parameter or a change of the access type parameter may be reported promptly, so that the mobility management device can accurately and promptly determine the connection type of the user equipment.

In a possible implementation, that the mobility management device determines the connection type of the user equipment based on one or more of a dual-connectivity capability of the user equipment, subscription information of the user equipment, or a local configuration of the mobility management device includes:

the mobility management device receives information that is about the dual-connectivity capability of the user equipment and that is sent by the user equipment, and the mobility management device determines the connection type of the user equipment based on the information about the dual-connectivity capability of the user equipment;

the mobility management device obtains the subscription information of the user equipment from a home subscriber server of the user equipment, and determines the connection type of the user equipment based on the subscription information; or the mobility management device obtains the local configuration of the mobility management device, where the local configuration includes information about whether the user equipment is allowed to establish the dual connectivity, and determines the connection type of the user equipment based on the local configuration.

In this embodiment, if the user equipment has the dual-connectivity capability, it may be determined that the connection type of the user equipment is the dual connectivity; otherwise, the connection type of the user equipment is the single connectivity. If the subscription information includes the information about that the user equipment has the dual-connectivity capability, it may be determined that the connection type of the user equipment is the dual connectivity; otherwise, the connection type of the user equipment is the single connectivity. If the local configuration allows the user equipment to use the dual connectivity, it is determined that the connection type of the user equipment is the dual connectivity; otherwise, it is determined that the connection type of the user equipment is the single connectivity. In addition, the foregoing three factors may be comprehensively considered. If all the three factors are met, it is determined that the connection type is the dual connectivity; otherwise, the connection type is the single connectivity. Alternatively, if one of the three factors is met, it is determined that the connection type is the dual connectivity; otherwise, the connection type is the single connectivity. Alternatively, if all the three factors are met, it is determined that the connection type is the dual connectivity; otherwise, it is determined that the connection type is the single connectivity. In another case, the connection type cannot be determined.

In a possible implementation, that the mobility management device receives a data usage report sent by the access node device, where the data usage report includes traffic information of the user equipment; and the mobility management device determines the connection type of the user equipment based on the data usage report includes:

when determining that the data usage report sent by the access node device is received in a connected-state period of the user equipment, the mobility management device determines that the connection type of the user equipment is the dual connectivity.

In another aspect, if determining that the data usage report sent by the access node device is not received in a connected-state period of the user equipment, the mobility management device determines that the connection type of the user equipment is the single connectivity.

In this embodiment, the connection type of the user equipment is determined based on whether the data usage report sent by the access node device is received in the connected-state period, and additional signaling does not need to be consumed to determine the connection type of the user equipment.

In a possible implementation, that the mobility management device determines the connection type of the user equipment based on the IP address of the access node device includes:

the mobility management device distinguishes the access node device as a first base station or a second base station based on the received IP address of the access node device;

when the access node device accessed by the user equipment includes the first base station and the second base station, the mobility management device determines that the connection type of the user equipment is the dual connectivity; and when the access node device accessed by the user equipment includes only the first base station, the mobility management device determines that the connection type of the user equipment is the single connectivity.

In this embodiment, the mobility management device may determine, based on the IP address, whether the type of the access node device is the first base station or the second base station, and then determine the connection type based on the type of the access node device accessed by the user equipment. The IP address may be reported to the mobility management device according to an existing procedure. Therefore, the additional signaling does not need to be consumed, and signaling overheads are reduced.

In a possible implementation, that the mobility management device distinguishes the access node device as a first base station or a second base station based on the received IP address of the access node device includes:

when the user equipment is not allowed to establish the dual connectivity, the mobility management device marks, as the first base station, an access node device corresponding to the IP address of the access node device after receiving the IP address of the access node device;

the mobility management device receives the IP address of the access node device in a procedure in which a service data packet forwarding channel is established in the first base station, and marks, as the first base station, the access node device corresponding to the IP address of the access node device; and when the user equipment accesses two IP addresses, and an access node device corresponding to one of the two IP addresses is the first base station, the mobility management device marks, as the second base station, an access node device corresponding to the other IP address of the two IP addresses.

In this embodiment, on a mobility management device side, a type of a base station to which the access node belongs is marked by analyzing the received IP address, so that different types of base stations can be accurately identified.

In a possible implementation, the procedure in which the service data packet forwarding channel is established in the first base station includes any one of a registration procedure, a tracking area update procedure, a service request procedure, and an attach procedure.

This embodiment provides a specific implementation means of how to mark the type of the access node device. That the user equipment is not allowed to establish the dual connectivity may be that the user equipment locally configured in the mobility management device does not have the dual connectivity capability, or may be that the user equipment cannot establish the dual connectivity due to another reason. In specific procedures such as the tracking area update procedure, the service request procedure, or the attach procedure, the primary access node usually first establishes a service data packet forwarding channel of a bearer on the primary access node. That is, an IP address and a tunnel endpoint identifier (tunnel endpoint identifier, TEID) that are of the access node and that are sent to the mobility management device are usually allocated by the primary access node. Therefore, the primary access node may be marked as the first base station. In a dual-connectivity scenario, there is usually one first base station and one second base station. Therefore, when it is determined that one of two base stations is the first base station, the other base station is the second base station. In this embodiment, different types of base stations may be accurately marked without increasing network overheads. This provides a basis for identifying the connection type of the user equipment.

In a possible implementation, the method further includes:

the mobility management device marks the access node device corresponding to the IP address as the first base station or the second base station. After a preset time period, the mobility management device deletes information about that the marked access node device corresponding to the IP address is the first base station or the second base station.

In this embodiment, the preset time point is an aging time point, and an aging timer may be used to implement timing. After an IP address is marked, a mark of the IP address is deleted when the timer expires, thereby ensuring accuracy of the mark.

In a possible implementation, the method further includes:

the mobility management device sends the identified connection type to a gateway device.

In this embodiment, the gateway device may include a serving gateway (serving gateway, SGW) and a data gateway (PDN gateway, PGW) in a 4G network, a session management function (session management function, SMF) device and a user plane function (user plane function, UPF) device in a 5G network, and the like. After sending the connection type to the gateway device, the mobility management device may provide a basis for the gateway device to perform quality of service control or charging control.

According to a second aspect, an embodiment of the present invention further provides a connection type identification method, including:

an access node device determines an access type parameter of user equipment, and sending the access type parameter of the user equipment to a mobility management device, where the access type parameter is used to indicate a radio access type of the user equipment or a type of the access node device; and the mobility management device receives the access type parameter that is of the user equipment and that is sent by the access node device, and determines a connection type of the user equipment based on the access type parameter.

In a possible implementation, the sending the access type parameter of the user equipment to a mobility management device includes:

the access node device sends a radio access bearer update request message, a channel handover request message, or a service flow notification message to the mobility management device, where the radio access bearer update request message, the channel handover request message, or the service flow notification message includes the access type parameter.

According to a third aspect, an embodiment of the present invention further provides a network system, including: a mobility management device and a gateway device.

The mobility management device is configured to perform any method procedure provided in the embodiments of the present invention.

The gateway device is configured to perform quality of service control or charging control on the user equipment based on a connection type.

In a possible implementation, the network system further includes a policy control function device, a session management device, or a user plane function device, where the mobility management device is further configured to send the connection type to the policy control function device, the session management device, or the user plane function device;

the policy control function device is configured to deliver a quality of service policy or a charging control policy to the user equipment based on the connection type;

the session management device is configured to perform quality of service control or charging control on the user equipment based on the connection type; or the user plane function device is configured to perform quality of service control or charging control on the user equipment based on the connection type.

According to a fourth aspect, an embodiment of the present invention further provides a mobility management device, including:

an identification unit, configured to identify a connection type used by user equipment to access a core network through an access node device, where the connection type is single connectivity or dual connectivity; when the connection type is the single connectivity, the user equipment accesses the core network through one access node device; and when the connection type is the dual connectivity, the user equipment accesses the core network through two access node devices; and an access control unit, configured to perform access control on the user equipment based on the connection type of the user equipment.

In a possible implementation, the identification unit is configured to determine the connection type of the user equipment based on an access type parameter of the user equipment sent by the access node device, where the access type parameter is used to indicate a radio access type of the user equipment or a type of the access node device;

the identification unit determines the connection type of the user equipment based on one or more of a dual-connectivity capability of the user equipment, subscription information of the user equipment, or a local configuration of the mobility management device;

the identification unit receives a data usage report sent by the access node device, where the data usage report includes traffic information of the user equipment, and the mobility management device determines the connection type of the user equipment based on the data usage report; or the identification unit receives a message carrying an internet protocol IP address of the access node device, and the identification unit determines the connection type of the user equipment based on the IP address of the access node device.

In a possible implementation, that the identification unit is configured to determine the connection type of the user equipment based on an access type parameter of the user equipment sent by the access node device includes: determining the connection type of the user equipment based on an access type parameter included in a radio access bearer update request message, a channel handover request message, or a service flow notification message sent by the access node device.

In a possible implementation, that the identification unit is configured to receive a message carrying an internet protocol IP address of the access node device, and the identification unit determines the connection type of the user equipment based on the IP address of the access node device includes:

receiving an initial context setup response message, a packet data unit PDU session resource setup response message, or a default bearer setup response message, and carrying the IP address of the access node device in the initial context setup response message, the PDU session resource setup response message, or the default bearer setup response message; and determining the connection type of the user equipment based on the IP address of the access node device.

In a possible implementation, that the identification unit is configured to determine the connection type of the user equipment based on one or more of a dual-connectivity capability of the user equipment, subscription information of the user equipment, or a local configuration of the mobility management device includes:

the identification unit is configured to determine the connection type of the user equipment based on information that is about the dual-connectivity capability of the user equipment and that is sent by the user equipment;

the identification unit is configured to determine the connection type of the user equipment based on the subscription information of the user equipment obtained from a home subscriber server of the user equipment; or the identification unit is configured to determine the connection type of the user equipment based on information that is about whether the user equipment is allowed to establish the dual connectivity and that is included in the local configuration of the mobility management device.

In a possible implementation, that the identification unit receives a data usage report sent by the access node device, where the data usage report includes traffic information of the user equipment, and the mobility management device determines the connection type of the user equipment based on the data usage report includes: The identification unit is configured to: When determining that the data usage report sent by the access node device is received in a connected-state period of the user equipment, determine that the connection type of the user equipment is the dual connectivity. In another aspect, if determining that the data usage report sent by the access node device is not received in a connected-state period of the user equipment, the identification unit determines that the connection type of the user equipment is the single connectivity.

In an optional implementation, the mobility management device further includes a marking unit, configured to distinguish the access node device as a first base station or a second base station based on the received IP address of the access node device.

The identification unit is specifically configured to: when the access node device accessed by the user equipment includes the first base station and the second base station, determine that the connection type of the user equipment is the dual connectivity; and when the access node device accessed by the user equipment includes only the first base station, determine that the connection type of the user equipment is the single connectivity.

In a possible implementation, the marking unit is configured to: when the user equipment is not allowed to establish the dual connectivity, mark, as the first base station, an access node device corresponding to the IP address of the access node device after receiving the IP address of the access node device; obtain the IP address of the access node device received in a procedure in which a service data packet forwarding channel is established in the first base station, and mark, as the first base station, the access node device corresponding to the IP address of the access node device; and when the user equipment accesses two IP addresses, and an access node device corresponding to one of the two IP addresses is the first base station, mark, as the second base station, an access node device corresponding to the other IP address of the two IP addresses.

In a possible implementation, the procedure in which the service data packet forwarding channel is established in the first base station includes any one of a registration procedure, a tracking area update procedure, a service request procedure, and an attach procedure.

In an optional implementation, the mobility management device further includes:

a recording control unit, configured to: after a preset time point at which the marking unit marks the access node device corresponding to the IP address as the first base station or the second base station, delete information about that the marked access node device corresponding to the IP address is the first base station or the second base station.

In an optional implementation, the mobility management device further includes:

a sending unit, configured to send the identified connection type to a gateway device.

According to a fifth aspect, an embodiment of the present invention further provides a connection type identification method, including:

a policy control function device receives a connection type of user equipment sent by a mobility management device; and the policy control function device delivers a quality of service policy or a charging control policy to the user equipment based on the connection type.

According to a sixth aspect, an embodiment of the present invention provides a method for performing access control on user equipment, including:

a session management device receives a connection type of user equipment sent by a mobility management device; and the session management device performs quality of service control or charging control on the user equipment based on the connection type.

According to a seventh aspect, an embodiment of the present invention provides a method for performing access control on user equipment, including:

a user plane function device receives a connection type of user equipment sent by a mobility management device; and the user plane function device performs quality of service control or charging control on the user equipment based on the connection type.

According to an eighth aspect, an embodiment of the present invention further provides a network device. The network device may be any one of a mobility management device, a gateway device, a policy control function device, a session management device, and a user plane function device, and includes a processor, a memory, and a transceiver. The processor, the memory, and the transceiver are connected in a communicable manner.

The memory stores program code.

The processor is configured to read the program code and cooperate with the transceiver to implement a function of the method implemented by the mobility management device in the embodiments of the present invention.

According to a ninth aspect, an embodiment of the present invention further provides a computer storage medium.

The storage medium stores program code. The program code includes program instructions. When the program instructions are executed by a processor, the processor is enabled to cooperate with a transceiver to implement a function of any method in the embodiments of the present invention.

According to a tenth aspect, an embodiment of the present invention further provides a computer program product. The computer program product includes program instructions. When the program instructions are executed by a processor, the processor cooperates with a transceiver to implement a function of any method implemented by any one of the mobility management device, the gateway device, the policy control function device, the session management device, and the user plane function device in the embodiments of the present invention.

In the technical solutions provided in all the foregoing aspects, the mobility management device may be a mobility management entity, or may be an access management function device.

In the technical solutions provided in all the foregoing aspects, the gateway device may be a data gateway, a serving gateway, a session management function device, a user plane function device, or a charging device.

In the technical solutions provided in all the foregoing aspects, the access type of the user equipment used by the gateway device, the policy control function device, the session management device, and the user plane function device may come from an access type determined by a mobility management device. For a manner of identifying the access type of the user equipment, refer to the embodiment of the first aspect.

BRIEF DESCRIPTION OF DRAWINGS

To describe the technical solutions in the embodiments of the present invention or in the background more clearly, the following describes the accompanying drawings in the embodiments of the present invention or the background.

DESCRIPTION OF EMBODIMENTS

The following describes embodiments of the present invention with reference to the accompanying drawings in the embodiments of the present invention.

FIG. 1A to FIG. 1E are schematic diagrams of five hybrid networking architectures. These hybrid networking architectures combine a 4G access network and a 5G access network. Architectures shown in FIG. 1A to FIG. 1C and an architecture shown in FIG. 1E may be referred to as non-standalone networking architectures.

In the foregoing hybrid networking architectures, user equipment simultaneously establishes connections to two access node devices (referred to as an access node or a node device for short below), which are an access node 1 and an access node 2 respectively. Service data of the user equipment may be forwarded through either or both of the two access nodes. In the non-standalone networking architecture, the user equipment may alternatively establish a connection to only one access node.

Figure 1A:
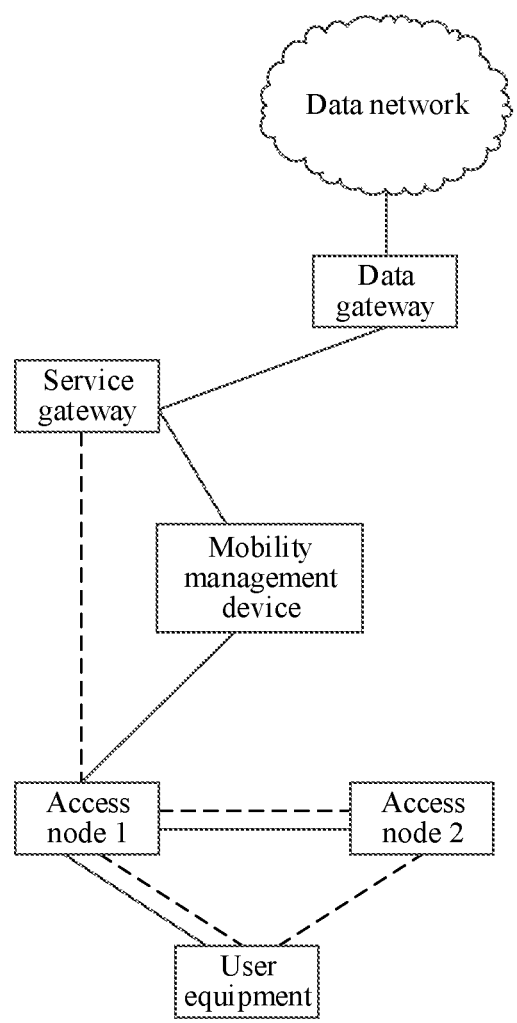
FIG. 1A to FIG. 1E are network architectural diagrams of hybrid networking according to an embodiment of the present invention.

In a mode (option 3 mode) shown in FIG. 1A, a serving gateway on a network side sends service data packets to the access node 1. The access node 1 distributes a part of the service data packets to the access node 2 based on a dual-connectivity capability of the user equipment, a network status, and the like, to forward the part of the service data packets to the user equipment. In this embodiment of the present invention, service data is forwarded in a form of a data packet. Therefore, the service data may be referred to as a service data packet. This is not described one by one in subsequent embodiments. Serving gateways shown in FIG. 1A, FIG. 1B, and FIG. 1C are one type of gateway device, and another gateway device such as a data gateway, an SMF device, or a UPF device is further mentioned in subsequent embodiments.

Figure 1B:
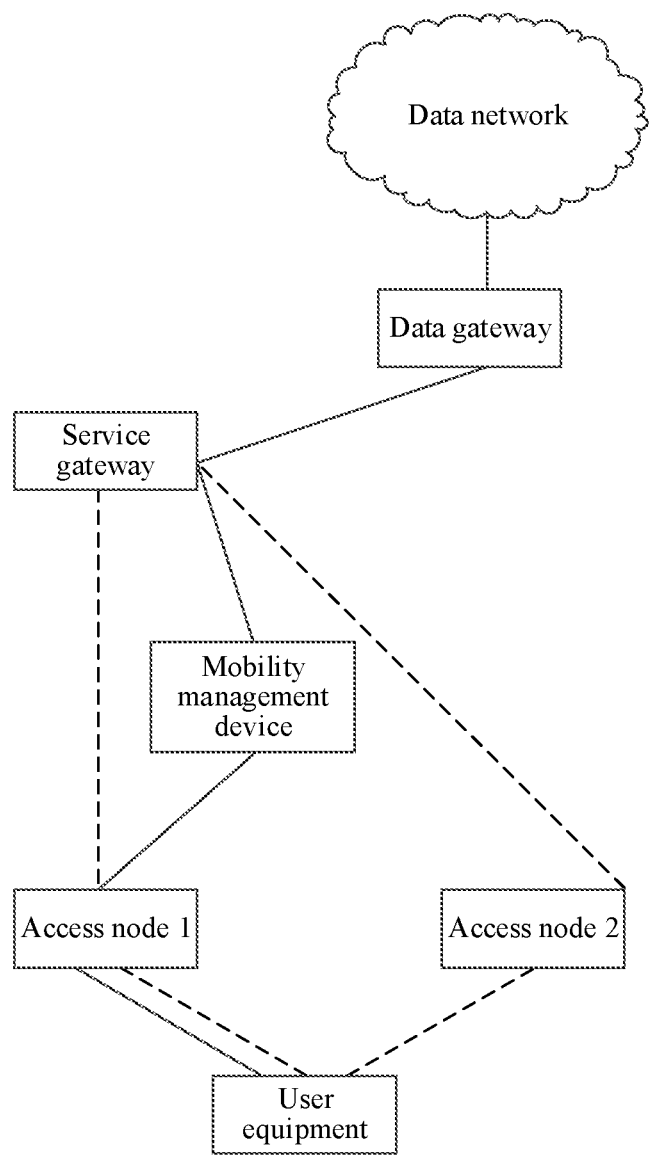

In a mode (option 3a mode) shown in FIG. 1B, service data packets are distributed to the access node 1 and the access node 2 at the serving gateway. Then, the access node 1 and the access node 2 separately forward received service data packets to the user equipment.

Figure 1C:
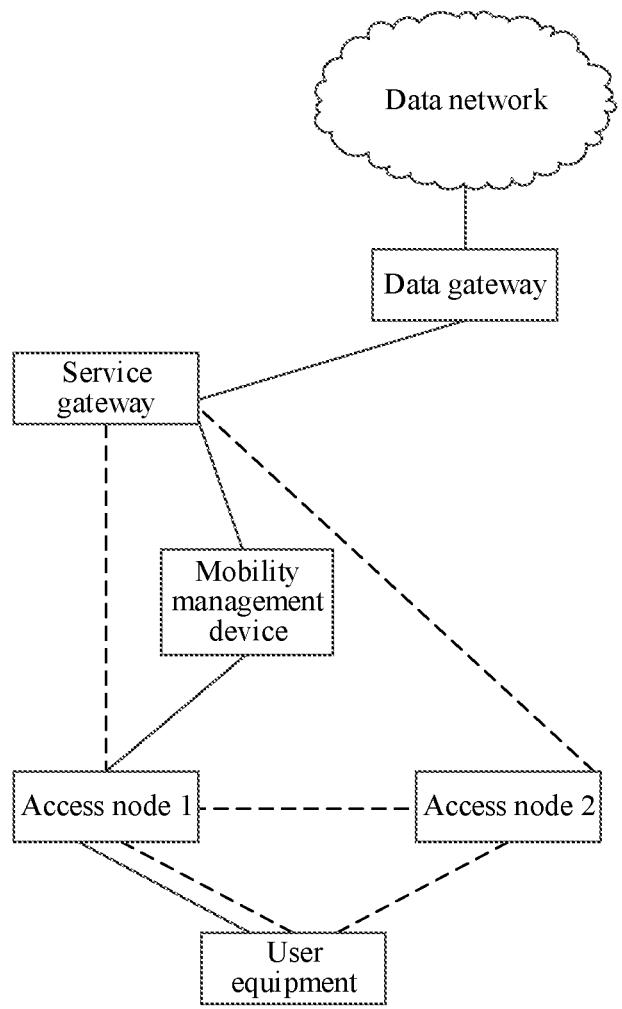

In a mode (option 3x mode) shown in FIG. 1C, a network side sends service data packets to the access node 2. The access node 2 may distribute a part of the service data packets to the access node 1. The access node 1 forwards the received service data packets to the user equipment. The access node 2 forwards, to the user equipment, service data packets that are not distributed to the access node 1.

In the non-standalone networking architectures shown in FIG. 1A, FIG. 1B, and FIG. 1C, the access node 1 that has a signaling interface with a mobility management device is referred to as a primary access node, a first access node, or a primary access node device, and the access node 2 that has no signaling interface with the mobility management device is referred to as a secondary access node, a second access node, or a secondary access node device.

Schematic diagrams of the non-standalone networking architectures show in FIG. 1A, FIG. 1B, and FIG. 1C may be applied to an evolved packet system (evolved packet system, EPS) network. The access node 1 and the access node 2 are nodes used by the user equipment to access a core network. The primary access node may be a base station (for example, a NodeB), and the secondary access node may be an evolved NodeB (evolved NodeB, eNB), a next generation NodeB (next generation NodeB, gNB) in a 5G mobile communications system, a base station in a future mobile communications system, or the like. The mobility management device may be an MME, the serving gateway may be a serving gateway (serving gateway, S-GW), and the data gateway may be a packet data network gateway (packet data network gateway, PDN-GW).

Figure 1D:
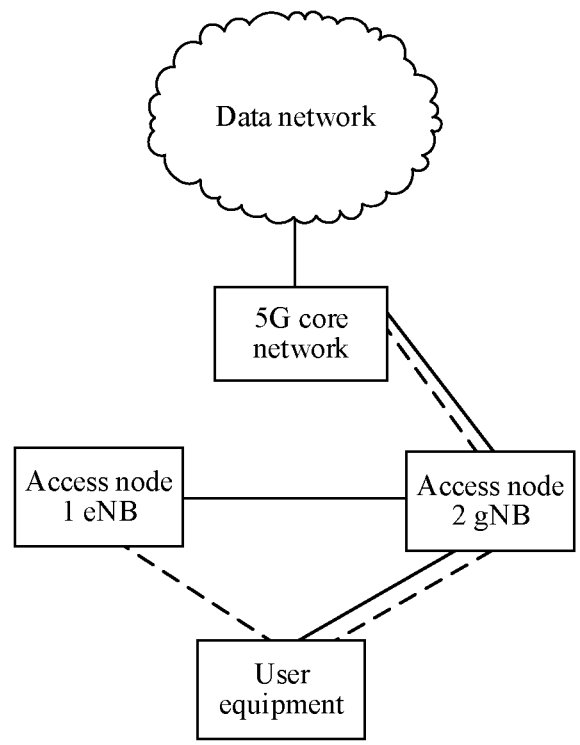

In a networking architectural diagram shown in FIG. 1D, the access node 1 and the access node 2 are connected to a 5G core network (5G Core, 5GC), and the user equipment may be simultaneously connected to the access node 1 and the access node 2. The access node 1 may be an eNB that supports evolved LTE (eLTE) access, and the access node 2 may be a gNB that supports NR access. Control-plane signaling is transmitted to the 5GC through the gNB. That is, the signaling is anchored on the gNB. The foregoing networking architecture may be corresponding to an option 4 networking mode. In addition, the eNB may alternatively be directly connected to the 5GC without using the gNB. In this case, the foregoing networking architecture is corresponding to an option 4a networking mode.

Figure 1E:
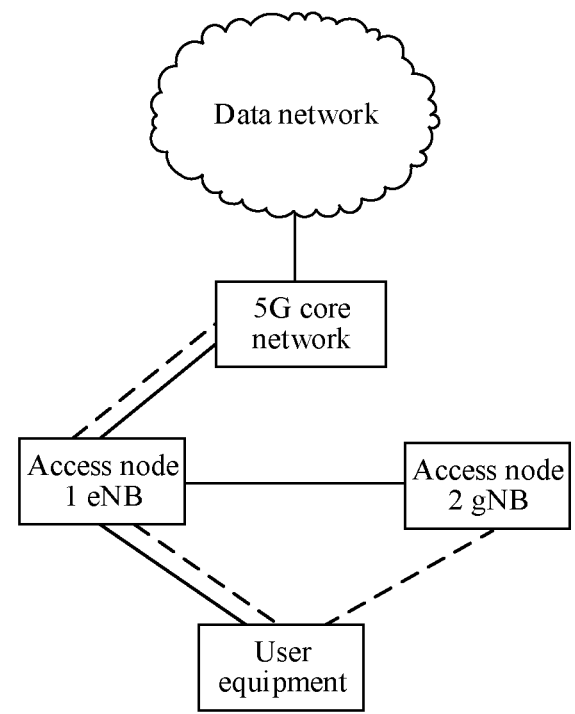

In a networking architectural diagram shown in FIG. 1E, the access node 1 and the access node 2 are connected to a 5G core network (5G Core, 5GC), and the user equipment may be simultaneously connected to the access node 1 and the access node 2. The access node 1 may be an eNB that supports evolved LTE (eLTE) access, and the access node 2 may be a gNB that supports NR access. Control-plane signaling is transmitted to the 5GC through the eNB. That is, the signaling is anchored on the eNB. The foregoing networking architecture may be corresponding to an option 7 networking mode. The gNB may alternatively be directly connected to the 5GC without using the eNB. In this case, the foregoing networking architecture is corresponding to an option 7a/7x networking mode.

Figure 2:
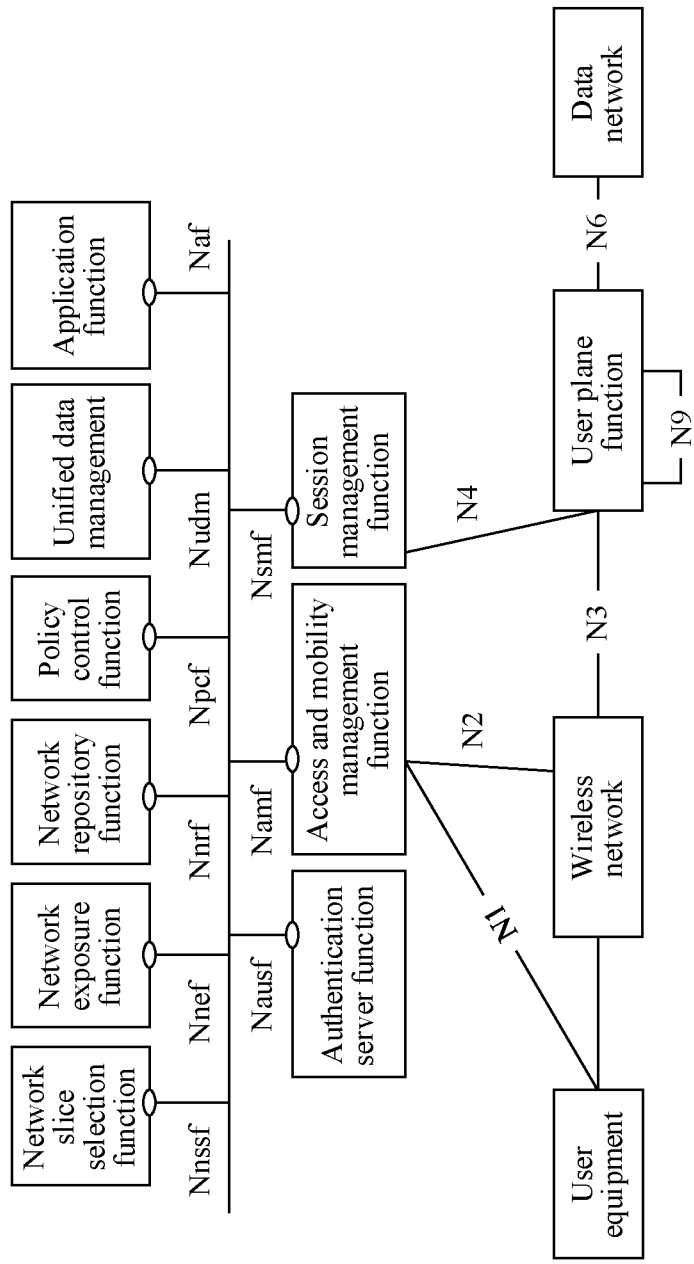
FIG. 2 is a network architectural diagram of a 5G network according to an embodiment of the present invention.

The schematic diagrams of networking architectures shown in FIG. 1A to FIG. 1E may be applied to a 5G network. FIG. 2 is a network architectural diagram of a 5G network, including user equipment, a wireless network, and a 5G core network. The user equipment accesses the wireless network by using an access node at a current location. A core network device is configured to: perform registration, security authentication, mobility management, location management, and session management on the user equipment, forward a data packet between the user equipment and an external data network, and the like.

A device included in the wireless network in FIG. 2 may be a new radio (new radio, NR) device. The core network device includes a session management function (session management function, SMF) device, an AMF device, a user plane function (user plane function, UPF) device, a unified data management (unified data management, UDM) device, a policy control function (policy control function, PCF) device, an authentication server function (authentication server function, AUSF) device, a network slice selection function (network slice selection function, NSSF) device, a network exposure function (network exposure function, NEF) device, a network repository function (network repository function, NRF) device, an application function (application function, AF) device, and the like. This is not specifically limited in this embodiment of this application.

The NR device may be corresponding to the access node in FIG. 1A to FIG. 1C, and an access and mobility management function AMF may be corresponding to the mobility management device in FIG. 1A to FIG. 1C. In addition, N1, N2, N3, N4, N9, N6, Nnssf, Nnef, Nnrf, Nnpcf, Nudm, Naf, Nausf, Namf, and Nsmf shown in FIG. 2 are all service-based interfaces, and details are not described herein.

In networking scenarios shown in FIG. 1D to FIG. 1E, dual-connectivity user equipment establishes connections to two access nodes. In this case, the user equipment is connected to two 5G base stations, that is, both a primary access node and a secondary access node are 5G base stations. For a 5G network architecture shown in FIG. 2, the primary access node may be an eNB, and the secondary access node may be a gNB. Alternatively, the primary access node may be a next-generation NodeB gNB, and the secondary access node may be an evolved NodeB eNB.

Based on the network architectures shown in FIG. 1A to FIG. 1E and FIG. 2, an embodiment of the present invention provides a method for identifying an access type of user equipment. Access control may be performed after the access type of the user equipment is identified. The method may specifically include: A mobility management device identifies a connection type used by user equipment to access a core network through an access node device, where the connection type is single connectivity or dual connectivity; and when the connection type is the single connectivity, the user equipment accesses the core network through one access node device; or when the connection type is the dual connectivity, the user equipment accesses the core network through two access node devices; and The mobility management device performs access control on the user equipment based on the connection type of the user equipment. In a subsequent embodiment, a method for identifying, by a mobility management device, a connection type of user equipment in different network architectures and use after identification are separately described by using examples. The use after identification may include access restriction, a charging policy, a quality of service control policy, license (license) control, and the like on the user equipment.

An example of a first-type method in which the mobility management device identifies the connection type of the user equipment is as follows.

The primary access node actively notifies the mobility management device of the access type of the user equipment. The access type may be an access node type, a radio access type, or the like. The mobility management device learns, based on the access type, whether a service data packet of the user equipment is forwarded through the primary access node or the secondary access node, to learn that the user equipment is single-connectivity user equipment or dual-connectivity user equipment.

The following provides a specific embodiment to describe a solution in which the mobility management device determines the connection type of the user equipment in this application. That user equipment accesses a 4G core network EPS is used as an example. With reference to the 5G network shown in FIG. 2, this embodiment may be applicable to the networking architectures shown in FIG. 1A to FIG. 1C.

In a non-standalone networking architecture in this embodiment, establishment of dual connectivity of user equipment is determined by a primary access node. For dual-connectivity user equipment, the primary access node may trigger procedures such as adding, updating, and deleting the secondary access node. These procedures are used to establish, update, and delete a forwarding channel for a service data packet that passes through the secondary access node.

For example, when the primary access node determines to forward, through the secondary access node, a service data packet of a bearer of the user equipment, the primary access node triggers an addition procedure of the secondary access node, to establish the dual connectivity for the user equipment.

Alternatively, when the user equipment has established the dual connectivity, and the primary access node determines to forward a service data packet of a bearer of the user equipment from the primary access node to the secondary access node for forwarding, the primary access node triggers an update procedure of the secondary access node, to hand over the bearer to the secondary access node.

Alternatively, when the user equipment has established the dual connectivity, and the primary access node determines to forward a service data packet that is of the user equipment and that is forwarded by the secondary access node, the primary access node triggers a deletion procedure of the secondary access node.

In the foregoing three procedures, because the service data packet of the bearer is forwarded by the secondary access node instead of being forwarded by the primary access node, or is forwarded by the primary access node instead of being forwarded by the secondary access node, the primary access node may notify a network side of an IP address and a TEID that are of the primary access node or the secondary access node and that are used to receive the service data packet. Based on this, a procedure in this embodiment of the present invention may be specifically as follows.

301: The primary access node sends an evolved universal terrestrial radio access network radio access bearer (evolved universal terrestrial radio access network radio access bearer, E-RAB) update indication message to the mobility management device. The E-RAB update indication message carries the IP address and the TEID that are of the primary access node or the secondary access node, to indicate a network to modify a forwarding channel of a downlink data packet.

The E-RAB update indication message may further carry an access type parameter. The access type parameter may be an access node type, for example, a NodeB, an eNB, or a gNB. The access type parameter may alternatively be a radio access type, for example, evolved universal terrestrial radio access (evolved universal terrestrial radio access, E-UTRA) or NR. When a type of an access node that forwards the service data packet is the NodeB or the eNB, a corresponding radio access type is the E-UTRA. When a type of an access node that forwards the service data packet is the gNB, a corresponding radio access type is the NR.

After receiving the radio access bearer update request message, the mobility management device learns, based on the access type parameter and a current networking mode that are carried in the radio access bearer update request message, whether the service data packet corresponding to the bearer is forwarded by the primary access node or the secondary access node.

More specifically, if the access type parameter is the eNB, the gNB, or the NR, the mobility management device learns that the access node that forwards the service data packet is the secondary access node. If the access type parameter is the NodeB or the E-UTRA, the mobility management device learns that the access node that forwards the service data packet is the primary access node. If a service data packet corresponding to any bearer of the user equipment is forwarded by the secondary access node, the mobility management device determines that the user equipment is the dual-connectivity user equipment. If service data packets corresponding to all bearers of the user equipment are forwarded by the primary access node, the mobility management device determines that the user equipment is the single-connectivity user equipment.

The mobility management device may perform access control on the user equipment based on information indicating that the user equipment is the dual-connectivity user equipment or the single-connectivity user equipment. A specific example of access control is as follows.

The mobility management device performs, based on a dual-connectivity capability of the user equipment and a dual-connectivity capability in subscription data, access control on a user that has a dual-connectivity capability but currently uses single connectivity. Consequently, the user equipment cannot normally use a data service.

Alternatively, the mobility management device separately performs license control on the single-connectivity user equipment or the dual-connectivity user equipment. To be specific, a quantity of single-connectivity user equipments and a quantity of dual-connectivity user equipments are separately counted. When the quantity of single-connectivity user equipments or the quantity of dual-connectivity user equipments exceeds a value purchased by a license, the mobility management device generates an alarm or restricts access of new user equipment.

302: The mobility management device sends an update bearer request (modify bearer request) message to a serving gateway, where the update bearer request message carries the IP address and the TEID that are of the primary access node or the secondary access node, and the radio access bearer update request message further carries the access type parameter.

After receiving the update bearer request message, the serving gateway stores the IP address and the TEID that are of the access node and that are carried in the update bearer request message. Subsequently, the serving gateway sends the service data packet corresponding to the bearer to the access node corresponding to the IP address and the TEID.

For the serving gateway, refer to a manner in which the mobility management device determines, based on the access type parameter, that the user equipment is the single-connectivity user equipment or the dual-connectivity user equipment. Details are not described herein again.

The serving gateway may perform differentiated charging on the single-connectivity user equipment or the dual-connectivity user equipment based on the information indicating that the user equipment is the dual-connectivity user equipment or the single-connectivity user equipment. Even for same user equipment, the serving gateway may perform differentiated charging on a service data packet forwarded by the primary access node and a service data packet forwarded by the secondary access node. For example, a tariff of the service data packet forwarded by the secondary access node is lower than a tariff of the service data packet forwarded by the primary access node.

Further, the serving gateway may send the access type parameter corresponding to the bearer to a data gateway, and the data gateway may notify a policy control function of a connection type of the user equipment, to perform differentiated quality of service control or charging control on the single-connectivity user equipment or the dual-connectivity user equipment.

303: The serving gateway returns an update bearer response (modify bearer response) message to the mobility management device, to notify the mobility management device that update of a downlink channel of the bearer is completed.

304: The mobility management device returns an E-RAB update indication acknowledgment (E-RAB modification indication confirm) to the primary access node, to notify the primary access node that the update of the downlink channel of the bearer is completed.

The following briefly describes a dual-connectivity handover process to facilitate solution integrity.

In the foregoing procedure, an example in which the primary access node performs a procedure of establishing, updating, and deleting the forwarding channel for the service data packet that passes through the secondary access node is used. The E-RAB update indication message carrying the access type parameter is sent to the mobility management device. In addition, the primary access node may alternatively send the access type parameter to the mobility management device by using another message in another procedure. For example, in a procedure in which a terminal performs X2 handover, the primary access node notifies the mobility management device of the IP address and the TEID that are of the primary access node or the secondary access node by using a channel handover request message. The channel handover request message carries the access type parameter, so that the mobility management device and another device on the network may determine, based on the access type parameter, that the user equipment is the single-connectivity user equipment or the dual-connectivity user equipment.

Figure 4:
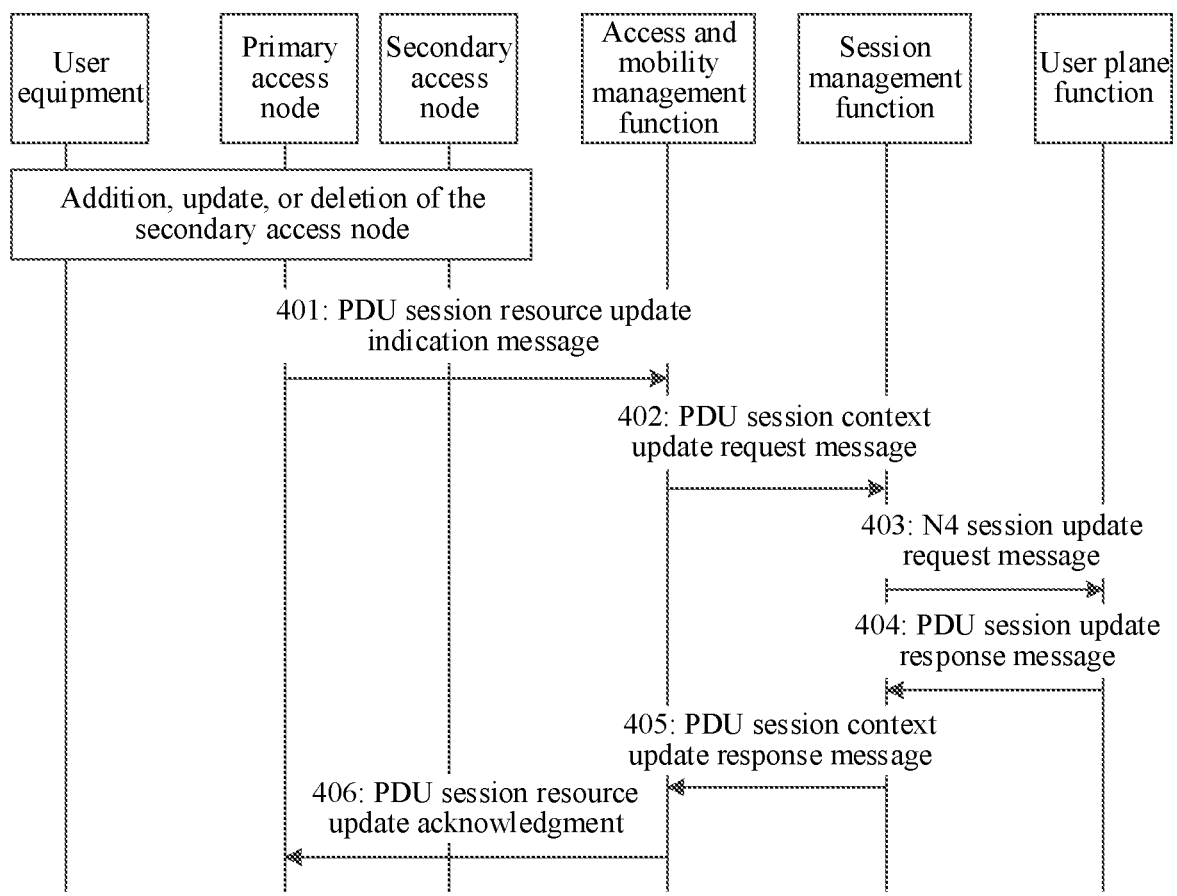
FIG. 4 is a schematic flowchart of a method according to an embodiment of the present invention.

That user equipment accesses a 5G core network is used as an example. As shown in FIG. 4, this embodiment may be applicable to the networking architectures shown in FIG. 1D and FIG. 1E. Refer to the 5G network architecture shown in FIG. 2.

In this embodiment, a primary access node distributes service data packets at a granularity of a quality of service flow (quality of service flow, QoS Flow). The primary access node notifies an AMF or SMF of an IP address and a TEID that are of the primary access node or a secondary access node corresponding to the quality of service flow (service flow for short), so that the AMF or SMF determines a connection type of the user equipment, and performs differentiated policy control on the user equipment based on the connection type.

In a non-standalone networking architecture in this embodiment, establishment of dual connectivity of the user equipment is determined by the primary access node. For dual-connectivity user equipment, the primary access node may trigger procedures such as adding, updating, and deleting the secondary access node. These procedures are used to establish, update, and delete a forwarding channel for a service data packet that passes through the secondary access node.

For example, when the primary access node determines to forward, through the secondary access node, service data of a service flow (QoS Flow) of the user equipment, the primary access node triggers an addition procedure of the secondary access node, to establish the dual connectivity for the user equipment.

Alternatively, when the user equipment has established the dual connectivity, and the primary access node determines to forward a service data packet of a service flow of the user equipment by the secondary access node instead of being forwarded by the primary access node, the primary access node triggers an update procedure of the secondary access node, to hand over the service flow to the secondary access node.

Alternatively, when the user equipment has established the dual connectivity, and the primary access node determines to forward a service data packet that is of the user equipment and that is forwarded by the secondary access node, the primary access node triggers a deletion procedure of the secondary access node.

In the foregoing three procedures, because the service data packet of the service flow is forwarded by the secondary access node instead of being forwarded by the primary access node, or is forwarded by the primary access node instead of being forwarded by the secondary access node, the primary access node needs to notify a network side of connect information of the primary access node or the secondary access node (for example, an IP address and a TEID that are used to receive the service data packet). Based on this, a procedure in this embodiment of the present invention may be specifically as follows.

401: The primary access node sends a PDU session resource update indication (session resource update indication) message to an access and mobility management function, where the PDU session resource update indication message carries the IP address and the TEID that are of the primary access node or the secondary access node, and is used to notify the access and mobility management function to modify a forwarding channel of a downlink data packet.

The PDU session resource update indication message further carries an access type parameter. The access type parameter may be an access node type, for example, an eNB or a gNB. The access type parameter may alternatively be a radio connection type, for example, E-UTRA or NR. When an access node that forwards the service data packet is the eNB, the radio connection type is the E-UTRA. When the access node that forwards the service data packet is the gNB, the radio connection type is the NR.

After receiving the PDU session resource update indication message, the access and mobility management function learns, based on the access type parameter and a networking mode, whether the service data packet of the service flow is forwarded by the primary access node or the secondary access node. If a service data packet of any service flow of the user equipment is forwarded by the secondary access node, the access and mobility management function determines that the user equipment is the dual-connectivity user equipment. If service data packets of all service flows of the user equipment are forwarded by the primary access node, the access and mobility management function determines that the user equipment is the single-connectivity user equipment.

The access and mobility management function may perform access control on the user equipment based on information indicating that the user equipment is the single-connectivity user equipment or the dual-connectivity user equipment.

For example, the access and mobility management function performs, based on a dual-connectivity capability of the user equipment and a dual-connectivity capability in subscription data, access control on user equipment that has a dual-connectivity capability but currently uses single connectivity. Consequently, the user equipment cannot normally use a data service.

Alternatively, the access and mobility management function separately performs license control on the single-connectivity user equipment or the dual-connectivity user equipment. To be specific, a quantity of single-connectivity user equipments and a quantity of dual-connectivity user equipments are separately counted. When the quantity of single-connectivity user equipments or the quantity of dual-connectivity user equipments exceeds a value purchased by a license, the mobility management device generates an alarm or restricts access of new user equipment.

402: The access and mobility management function sends a PDU session context update request message to a session management function.

The PDU session context update request message carries the IP address and the TEID that are of the primary access node or the secondary access node, and the PDU session context update request message further carries the access type parameter. The PDU session context update request may be sent through an Nsmf interface.

For the session management function, refer to a manner in which the access and mobility management function determines, based on the access type parameter, that the user equipment is the single-connectivity user equipment or the dual-connectivity user equipment, and details are not described herein again.

The session management function may perform differentiated charging or quality of service control on the single-connectivity user equipment or the dual-connectivity user equipment based on the information indicating that the user equipment is the dual-connectivity user equipment or the single-connectivity user equipment. Even for same user equipment, the session management function may perform differentiated charging or quality of service control on a service data packet forwarded by the primary access node and a service data packet forwarded by the secondary access node.

Further, the session management function may notify a policy control function of an access type parameter corresponding to the service flow, so that the policy control function performs differentiated quality of service control, charging control, or the like on the single-connectivity user equipment or the dual-connectivity user equipment.

403: The session management function sends an N4 session update request (session modification request) message to a user plane function, where the N4 session update request message carries the IP address and the TEID that are of the primary access node or the secondary access node, and the N4 session update request message further carries the access type parameter, so that the user plane function performs differentiated quality of service control or charging control on the single-connectivity user equipment or the dual-connectivity user equipment.

The user plane function stores the IP address and the TEID that are carried in the N4 session update request message. Subsequently, the user plane function sends the service data packet of the service flow of the user equipment to the access node corresponding to the IP address and the TEID.

404: The user plane function returns an N4 PDU session update response (session modification response) message to the session management function. The PDU session update response may be sent through the Nsmf interface.

405: The session management function returns a PDU session context update response (PDU session update context response) message to the access and mobility management function, to notify the access and mobility management function that update of a downlink channel of the service flow is completed.

406: The access and mobility management function returns a PDU session resource update acknowledgment (PDU session resource update acknowledge) message to the primary access node, to notify the primary access node that the update of the downlink channel of the service flow is completed.

In the foregoing procedure, an example in which the primary access node performs a procedure of establishing, updating, and deleting the forwarding channel for the service data packet that passes through the secondary access node is used. The PDU session resource update indication message carrying the access type parameter is sent to the access and mobility management function. In addition, in a procedure in which the UE performs X2 handover, the primary access node may further notify the IP address and the TEID that are of the primary access node or the secondary access node by using a channel handover request message. The channel handover request message carries the access type parameter, so that the access and mobility management function and another device on a network may determine, based on the access type parameter, that the user equipment is the single-connectivity user equipment or the dual-connectivity user equipment.

The foregoing provides a solution in which the mobility management device identifies a connection type of the user equipment based on the access type parameter. The following provides another solution in which the mobility management device identifies the connection type of the user equipment. In this solution, a device on a core network, for example, a mobility management device (MME or AMF), may learn, through self-learning, that user equipment is single-connectivity user equipment or dual-connectivity user equipment.

Figure 5:
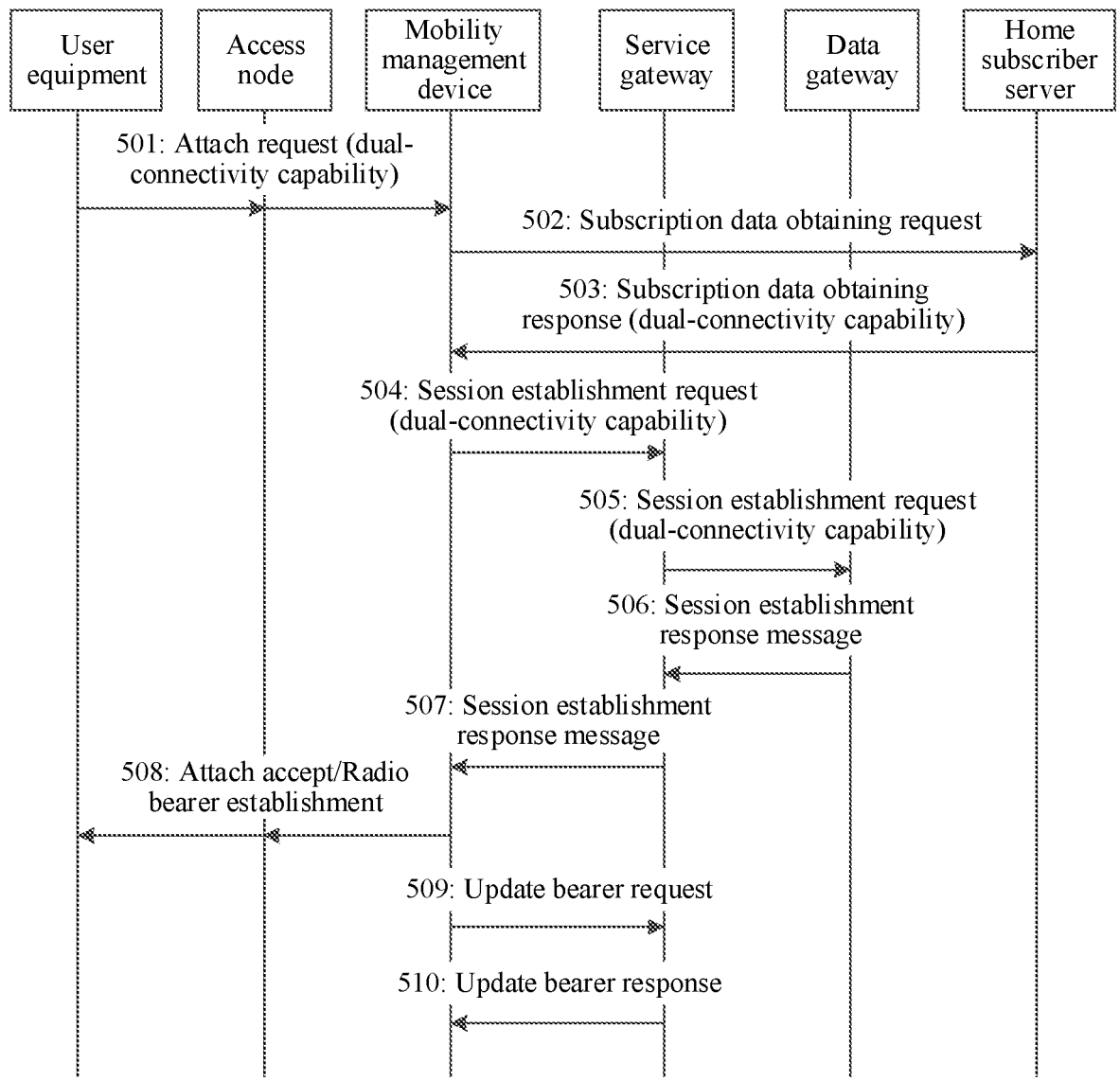
FIG. 5 is a schematic flowchart of a method according to an embodiment of the present invention.

That the user equipment accesses an EPS core network over a radio access network is used as an example. As shown in FIG. 5, a home subscriber server (home subscriber server, HSS) is responsible for managing and maintaining user subscription information. The home subscriber server may alternatively integrate a function of UDM.

501: The user equipment is powered on, initiates an attach procedure, and sends an attach request message to the mobility management device, where the attach request message is forwarded to the mobility management device through a primary access node.

The attach request message carries information about a dual-connectivity capability of the user equipment, for example, the information indicates that the user equipment supports a dual connectivity with new radio (dual connectivity with NR) capability.

502: The mobility management device sends a subscription data obtaining request to the HSS of the user equipment.

503: The mobility management device receives a subscription data obtaining response returned by the HSS, where the subscription data obtaining response includes subscription data of the user equipment, and the subscription data includes the information about the dual-connectivity capability of the user equipment.

For example, the subscription data includes a new radio as secondary radio access type (NR as secondary radio access type, NR as secondary RAT) capability.

The mobility management device may identify the connection type of the user equipment through self-learning in the following manner.

The mobility management device identifies, based on the information that is about the dual-connectivity capability and that is sent by the user equipment and the information about the dual-connectivity capability in the subscription data, user equipment that has the dual-connectivity capability and that subscribes to the dual-connectivity capability in the subscription data as dual-connectivity user equipment.

In addition, the mobility management device may further identify user equipment with reference to a local configuration, for example, identify, as dual-connectivity user equipment, user equipment whose local configuration allows establishment of dual connectivity. The mobility management device may identify, as single-connectivity user equipment, user equipment whose local configuration does not allow the establishment of dual connectivity.

The mobility management device may perform access control on the user equipment based on information about the identified dual-connectivity user equipment or the identified single-connectivity user equipment.

For example, the mobility management device separately performs license control on the single-connectivity user equipment or the dual-connectivity user equipment. To be specific, a quantity of single-connectivity user equipments and a quantity of dual-connectivity user equipments are separately counted. When the quantity of single-connectivity user equipments or the quantity of dual-connectivity user equipments exceeds a value purchased by a license, the mobility management device generates an alarm or restricts access of new user equipment.

504: The mobility management device sends a session establishment request message to a serving gateway.

For the dual-connectivity user equipment, the session establishment request message carries a dual-connectivity capability indication, for example, a dual connectivity with new radio (dual connectivity with NR) capability.

The serving gateway may identify, as dual-connectivity user equipment, user equipment that carries the dual-connectivity capability indication.

The serving gateway may perform differentiated charging on the single-connectivity user equipment or the dual-connectivity user equipment based on information about whether the user equipment is the dual-connectivity user equipment.

505: The serving gateway S-GW sends a session establishment request message to a data gateway.

For the dual-connectivity user equipment, the session establishment request message carries a dual-connectivity capability indication, for example, a dual connectivity with NR capability.

The data gateway PGW identifies, as dual-connectivity user equipment, user equipment that carries the dual-connectivity capability indication.

The data gateway may perform differentiated charging or quality of service control on the single-connectivity user equipment or the dual-connectivity user equipment based on the information about whether the user equipment is the dual-connectivity user equipment.

The data gateway may further send the dual-connectivity capability indication to a policy control function, so that the policy control function performs differentiated quality of service control or charging control on the single-connectivity user equipment or the dual-connectivity user equipment.

506: The data gateway returns a session establishment response message to the serving gateway, to indicate that a session between the serving gateway and the data gateway is successfully established.

507: The serving gateway returns a session establishment response message to the mobility management device, to indicate that a session between the serving gateway and the mobility management device is successfully established.

508: The mobility management device sends an attach accept message to the user equipment, to complete the attach procedure of the user equipment.

509: The mobility management device sends an update bearer request (modify bearer request) message to the serving gateway, to notify the serving gateway to establish a downlink tunnel for forwarding a service data packet.

In this step, a specific procedure may be as follows. The mobility management device sends the update bearer request message to the serving gateway, where the update bearer request message carries an IP address and a TEID that are of the primary access node or the secondary access node. After receiving the update bearer request message, the serving gateway stores the IP address and the TEID that are of the access node and that are carried in the update bearer request message. The serving gateway sends the service data packet corresponding to the bearer to the access node corresponding to the IP address and the TEID.

510: The serving gateway returns an update bearer response (modify bearer response) message to the mobility management device, to notify the mobility management device that update of the downlink tunnel of the bearer is completed.

The foregoing embodiment is described by using the attach procedure as an example. When the UE performs tracking area update, a device on a core network may also identify the connection type of the user equipment. In this case, the UE carries the dual-connectivity capability indication in a tracking area update request message. After receiving the tracking area update request message, the mobility management device identifies the connection type of the user equipment by using a method similar to the foregoing self-learning method. Subsequently, the mobility management device may further send a session establishment request message to the serving gateway. The session establishment request message carries the dual-connectivity capability indication of the user equipment. Processing procedures of the mobility management device, the serving gateway, and the data gateway are similar to the attach procedure, and details are not described in this embodiment.

Figure 6:
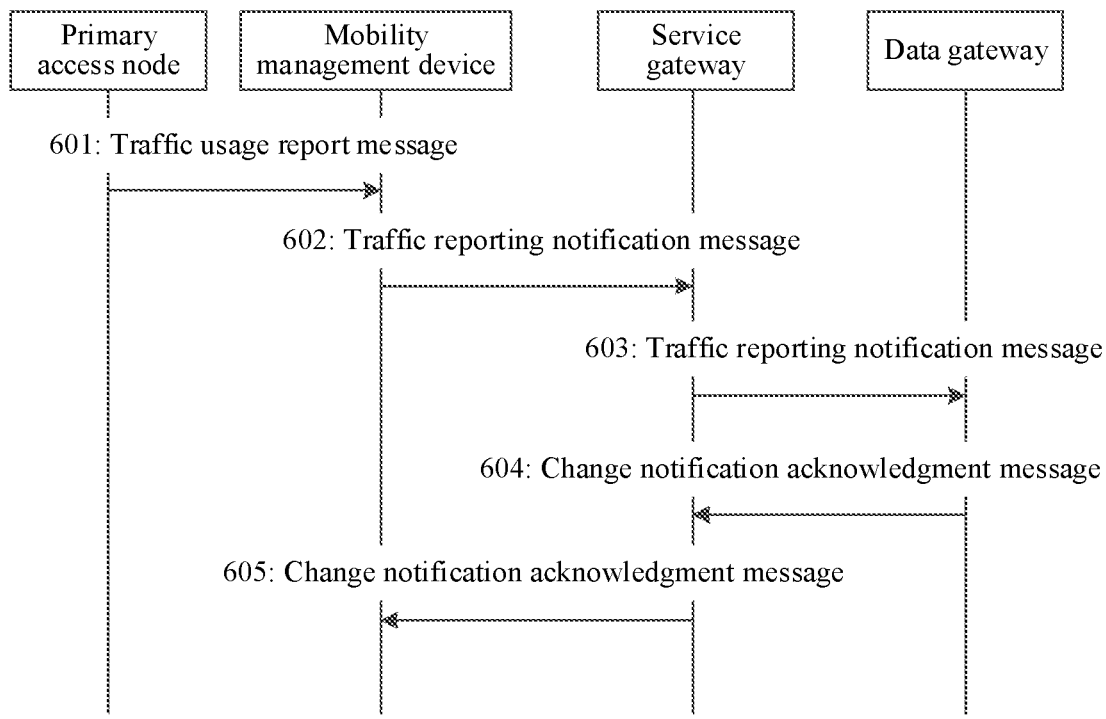
FIG. 6 is a schematic flowchart of a method according to an embodiment of the present invention.

That the user equipment accesses an EPS core network over a radio access network is still used as an example. As shown in FIG. 6, in a non-standalone networking architecture in this embodiment, a primary access node may trigger a traffic reporting procedure of dual-connectivity user equipment, and notify core network devices including a mobility management device of a bearer and corresponding forwarding traffic information that are forwarded through a secondary access node.

601: The primary access node sends a traffic usage report (secondary rat usage data report) message of the user equipment to the mobility management device. The traffic usage report message carries a bearer identifier and corresponding traffic information.

If the traffic usage report includes the traffic information forwarded by the secondary access node, the mobility management device determines, based on the traffic information, that the user equipment is the dual-connectivity user equipment. If the traffic usage report includes only traffic information forwarded by the primary access node, the mobility management device determines, based on the traffic information, that the user equipment is single-connectivity user equipment. Traffic information of the user equipment includes traffic information of uplink and downlink data packets of the user equipment.

The mobility management device may perform access control on the user equipment.

For example, the mobility management device performs, based on a dual-connectivity capability of a user and a dual-connectivity capability in subscription data, access control on a user that has a dual-connectivity capability but currently uses single connectivity. Consequently, the user equipment cannot normally use a data service.

The mobility management device separately performs license control on the single-connectivity user equipment or the dual-connectivity user equipment. To be specific, a quantity of single-connectivity user equipments and a quantity of dual-connectivity user equipments are separately counted. When the quantity of single-connectivity user equipments or the quantity of dual-connectivity user equipments exceeds a value purchased by a license, the mobility management device generates an alarm or restricts access of new user equipment.

602: The mobility management device sends a traffic reporting notification message to a serving gateway.

For the serving gateway, refer to a manner in which the mobility management device determines, based on the traffic reporting notification message, that the user equipment is the single-connectivity user equipment or the dual-connectivity user equipment.

The serving gateway may perform differentiated charging on the single-connectivity user equipment or the dual-connectivity user equipment based on information indicating that the user equipment is the single-connectivity user equipment or the dual-connectivity user equipment. For same user equipment, the serving gateway may further perform differentiated charging on a service data packet forwarded by the primary access node and a service data packet forwarded by the secondary access node.

603: The serving gateway sends the traffic reporting notification message to a data gateway.

For the data gateway, refer to a manner in which the access and mobility management device determines, based on the traffic reporting notification message, that the user equipment is the single-connectivity user equipment or the dual-connectivity user equipment. Details are not described herein again.

The data gateway may perform differentiated charging or quality of service control on the single-connectivity user equipment or the dual-connectivity user equipment based on the information indicating that the user equipment is the single-connectivity user equipment or the dual-connectivity user equipment.

The data gateway may further send the traffic reporting notification message to a policy control function, so that the policy control function performs differentiated quality of service control or charging control on the single-connectivity user equipment or the dual-connectivity user equipment.

604: The data gateway returns a change notification acknowledgment (change notification ACK) message.

605: The serving gateway returns a change notification acknowledgment message.

In this embodiment, the traffic reporting notification message may be reported by using a dedicated procedure, or may be reported in a signaling message of a current procedure. This does not affect implementation of this embodiment, and details are not described herein. The current procedure may be procedures such as a handover procedure, a registration update procedure, a service request procedure, a PDU session update/deletion procedure, a tracking area update procedure, and a dedicated bearer update/deletion procedure.

In addition, if the mobility management device receives, within a connected-state period of the user equipment, the traffic usage report reported by the primary access node, the mobility management device still marks the user equipment as the dual-connectivity user equipment after an Si release (release) procedure. If the mobility management device does not receive, within the connected-state period, the traffic usage report reported by the primary access node, the mobility management device marks the user equipment as the single-connectivity user equipment after the Si release procedure. In this embodiment, after a connection type of the user equipment is learned, the connection type of the user may be determined by determining whether the primary access node reports the traffic usage report within the connected-state period. This does not need to consume additional signaling or transmit additional data, thereby saving network resources.

Figure 7:
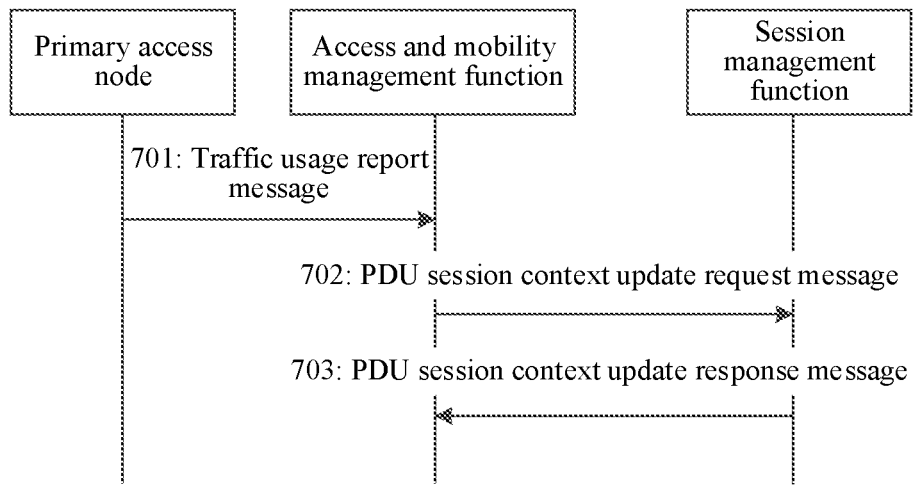
FIG. 7 is a schematic flowchart of a method according to an embodiment of the present invention.

That user equipment accesses a 5G core network is used as an example. As shown in FIG. 7, in this embodiment, a primary access node may trigger a traffic reporting procedure of dual-connectivity user equipment, and the primary access node notifies core network devices including an access and mobility management function of a traffic flow and a traffic reporting notification that are forwarded through a secondary access node.

701: The primary access node sends a traffic usage report (secondary rat usage data report) message to the access and mobility management function, where a traffic reporting notification message carries a service flow identifier (QoS flow ID, QFI) and corresponding traffic information.

The access and mobility management function determines, based on the traffic reporting notification message, that the user equipment is the dual-connectivity user equipment, and may perform access control on the user equipment.

For example, the access and mobility management function separately performs license control on single-connectivity user equipment or the dual-connectivity user equipment. To be specific, a quantity of single-connectivity user equipments and a quantity of dual-connectivity user equipments are separately counted. When the quantity of single-connectivity user equipments or the quantity of dual-connectivity user equipments exceeds a value purchased by a license, the access and mobility management function generates an alarm or restricts access of new user equipment.

702: The access and mobility management function sends a PDU session context update request to a session management function, where the traffic reporting notification message carries the service flow identifier obtained in 701 and traffic information corresponding to the service flow identifier.

The PDU update session management context request is sent through an Nsmf interface.

For the session management function, refer to a manner in which the access and mobility management function determines, based on the traffic reporting notification message, that the user equipment is the single-connectivity user equipment or the dual-connectivity user equipment. Details are not described herein again.

The session management function may perform differentiated charging or quality of service control on the single-connectivity user equipment or the dual-connectivity user equipment based on information indicating that the user equipment is the dual-connectivity user equipment or the single-connectivity user equipment. In addition, for same user equipment, the session management function may perform differentiated charging and quality of service control on a service data packet forwarded by the primary access node and a service data packet forwarded by the secondary access node.

703: The session management device returns a PDU session context update response.

The PDU update session management context response may be sent through an Nsmf interface.

In this embodiment, the traffic reporting may be reported by using an enumerated dedicated procedure, or may be reported in a signaling message of a current procedure. This does not affect implementation of this embodiment, and details are not described herein. The dedicated procedure refers to a procedure of delivering a change notification request. The current procedure may be procedures such as a handover procedure, a registration update procedure, a service request procedure, a PDU session update/deletion procedure, a tracking area update procedure, and a dedicated bearer update/deletion procedure.

In addition, if the access and mobility management function receives, within a connected-state period of the user equipment, the secondary RAT usage data report reported by the primary access node, the access and mobility management function marks the user equipment as the dual-connectivity user equipment after an N2 release (release) procedure. If the access and mobility management function does not receive, within the connected-state period, the secondary RAT usage data report reported by the primary access node, the access and mobility management function marks the user equipment as the single-connectivity user equipment after the N2 release procedure.

The embodiments of the present invention further provide a method for a network side device to mark an access node type through self-learning, and determine a connection type of user equipment based on the access node type, which is specifically as follows.

1. The EPS is used as an example.

Figure 3:
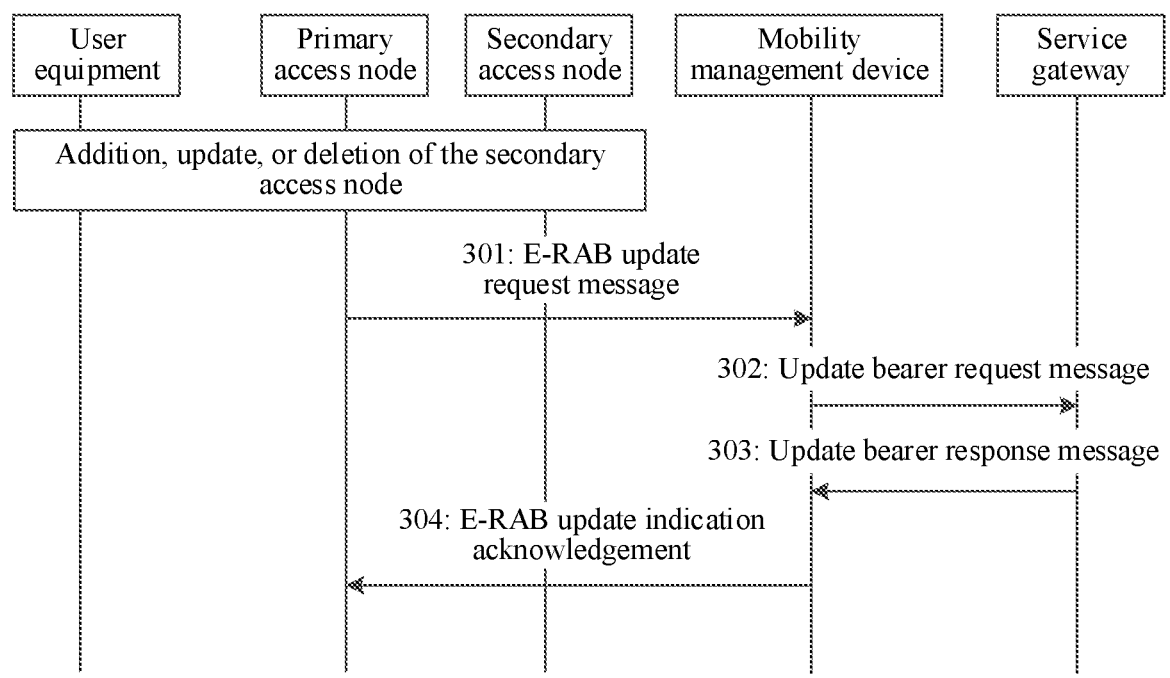
FIG. 3 is a schematic flowchart of a method according to an embodiment of the present invention.

In the procedures shown in FIG. 3 and FIG. 5, after the primary access node sends, to the mobility management device, the IP address and the TEID that are allocated to the bearer, the mobility management device forwards the IP address and the TEID to the serving gateway. The mobility management device may first mark the access node corresponding to the IP address, which is specifically as follows.

(1). After the mobility management device determines whether the user equipment is allowed to use dual connectivity, for user equipment that is not allowed to use the dual connectivity, namely, the single-connectivity user equipment, the IP address and the TEID that are of the access node and that are received by the mobility management device should be allocated by the primary access node. Therefore, the mobility management device may mark the access node corresponding to the IP address as the primary access node or a first base station.

(2). When the mobility management device determines that the user equipment is allowed to use the dual connectivity, in specific procedures such as the tracking area update procedure, the service request procedure, and the attach procedure described above, the primary access node first establishes, on the primary access node, the forwarding channel of the service data packet of the bearer, that is, the IP address and the TEID that are of the access node and that are sent to the mobility management device should be allocated by the primary access node.

Therefore, in these specific procedures, after receiving the IP address and the TEID that are of the access node, the mobility management device marks the access node corresponding to the received IP address as a first base station, or more specifically marks the access node as a 4G base station, an eNodeB, the primary access node, or a first access node. That is, after receiving an initial context response message sent by the access node, and obtaining the IP address and the TEID that are of the access node and that are carried in the message, the mobility management device marks the access node corresponding to the IP address as the first base station.

(3). After determining that the connection type of the user equipment is the dual-connectivity user equipment, the mobility management device receives an IP address of a new access node, and may mark the new access node corresponding to the IP address as a second base station, or more specifically mark the new access node as a 5G base station, a gNB, an eNB, or the secondary access node. Alternatively, if the mobility management device receives IP addresses of a plurality of access nodes, the mobility management device marks, as a second base station, another access node that is of same user equipment and that is different from an access node corresponding to a user-plane IP address marked as a first base station.

For example, as shown in FIG. 3, because the E-RAB indication message is sent by the dual-connectivity user equipment, after receiving the E-RAB update indication message, the mobility management device adds the IP address and the TEID that are of the access node to the E-RAB update indication message. Because there is an IP address marked as the first base station, and the IP address of the access node carried in the current E-RAB update indication message is different from the marked IP address of the first base station, the mobility management device marks the access node corresponding to the IP address in the newly received E-RAB update indication message as the second base station.

Further, the mobility management device marks a base station type by using the foregoing three methods, and the mobility management device may set an aging timer for the base station type. After the aging timer expires, the mobility management device clears the marked base station type, and re-executes the learning process in this embodiment.

Based on the foregoing self-learning process, the mobility management device can learn of bearers established by the user equipment, that is, which bearers are established on the primary access node and which bearers are established on the secondary access node. Therefore, that the mobility management device can identify the connection type of the user equipment is specifically as follows: When any bearer of the user equipment is established on the secondary access node, the mobility management device determines that the user equipment is the dual-connectivity user equipment; and when all bearers of the user equipment are established on the primary access node, the mobility management device determines that the user equipment is the single-connectivity user equipment.

Further, after obtaining an identification result by identifying an access node type of the user equipment through self-learning, the mobility management device may notify devices such as the serving gateway, the data gateway, the policy control function and so on, of the identification result, for example, send the identified access node type to the serving gateway, the data gateway, and the policy control function. For another example, the mobility management device notifies, through a signaling message, the devices such as the serving gateway, the data gateway, the policy control function and so on, of information indicating that the user equipment is the single-connectivity user equipment or the dual-connectivity user equipment.

2. The 5G core network is used as an example.

In the procedure shown in FIG. 4, after the primary access node sends, to the access and mobility management function, the IP address and the TEID that are allocated to the bearer, the access and mobility management function forwards the IP address and the TEID to the session management function, and the session management function forwards the IP address and the TEID to the user plane function. The access and mobility management function may first mark the access node corresponding to the IP address, which is specifically as follows.

(1). In the specific procedures such as the registration procedure or the service request procedure, the primary access node first locally establishes the forwarding channel for the service data packet related to the service flow. Therefore, the IP address and the TEID that are of the access node and that are sent to the access and mobility management function are allocated by the primary access node. Therefore, in the foregoing specific procedures, after receiving the IP address and the TEID that are of the access node, the access and mobility management function marks the access node corresponding to the received IP address as a first base station.

For example, after receiving an initial context response message sent by the access node, and obtaining the IP address and the TEID that are of the access node and that are carried in the message, the access and mobility management function marks the access node corresponding to the IP address as the first base station.

(2). After determining that the connection type of the user equipment is the dual-connectivity user equipment, the access and mobility management function receives an IP address of a new access node, and may mark the new access node corresponding to the IP address as a second base station. Alternatively, if the access and mobility management function receives IP addresses of a plurality of access nodes, the access and mobility management function marks, as a second base station, another access node that is of same user equipment and that is different from an access node corresponding to a user-plane IP address marked as a first base station.

For example, the PDU session resource update indication message in FIG. 4 is sent by the dual-connectivity user equipment. After receiving the PDU session resource update indication message, the access and mobility management function may obtain the IP address and the TEID that are of the access node from the PDU session resource update indication message. If there is an IP address marked as the first base station, and the IP address of the access node carried in the current message is different from the IP address marked as the first base station, the access node corresponding to the IP address carried in the PDU session resource update indication message is marked as the second base station.

Further, the access and mobility management function marks a base station type by using the foregoing two methods, and the access and mobility management function may set an aging timer for the base station type. After the aging timer expires, the mobility management device clears the marked base station type, and re-executes the learning process in this embodiment.

Based on the foregoing self-learning process, the access and mobility management function can learn of service flows established by the user equipment, that is, which service flows are established on the primary access node and which service flows are established on the secondary access node. Therefore, for the access and mobility management function, refer to the foregoing method for identifying, by a mobility management device, a connection type of user equipment, and details are not described herein again.

Further, after obtaining an identification result by identifying an access node type of the user equipment through self-learning, the access and mobility management function may notify the session management device, the user plane function, and the policy control function of the identification result. For example, the access and mobility management function sends the identified access node type to the session management device, the user plane function, and the policy control function. For another example, the access and mobility management function notifies, through a signaling message, the session management device, the user plane function, and the policy control function of information indicating that the user equipment is the single-connectivity user equipment or the dual-connectivity user equipment.

Figure 8:
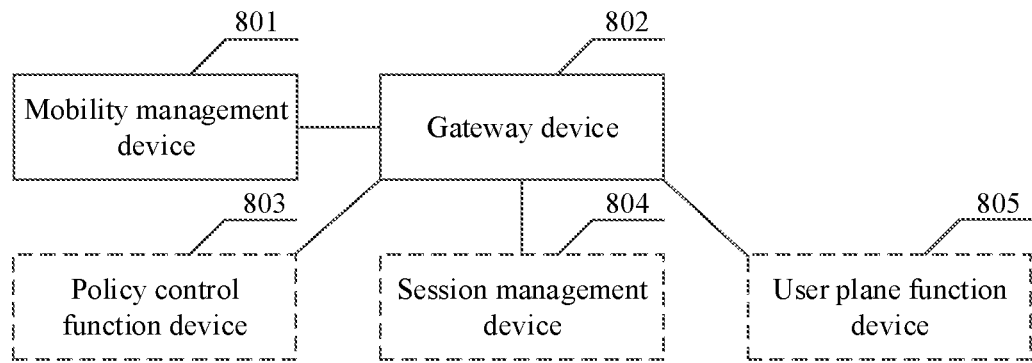
FIG. 8 is a schematic structural diagram of a network system according to an embodiment of the present invention.

This application further provides a network system. As shown in FIG. 8, the network system includes a mobility management device 801 and a gateway device 802. Refer to the network architectures shown in FIG. 1A, FIG. 1B, FIG. 1C, and FIG. 2.

The mobility management device 801 is configured to perform the method procedure performed by the mobility management device according to the first aspect of the embodiments of the present invention, and more specifically, for example, the method procedures performed by the mobility management device in FIG. 3, FIG. 5, and FIG. 6, and the method procedure performed by the access and mobility management function in FIG. 4.

The gateway device 802 is configured to perform quality of service control or charging control on user equipment based on a connection type received from the mobility management device.

In this embodiment, the mobility management device identifies a connection type of the user equipment and notifies the gateway device of the connection type. The gateway device may perform, based on the connection type, differentiated quality of service control and charging control on user equipments of different connection types.

In a possible implementation, the network system further includes a policy control function device 803, a session management device 804, or a user plane function device 805, where the mobility management device 801 is further configured to send the connection type to the policy control function device 803, the session management device 804, or the user plane function device 805;

the policy control function device 803 is configured to deliver a quality of service policy or a charging control policy to the user equipment based on the connection type;

the session management device 804 is configured to perform quality of service control or charging control on the user equipment based on the connection type; or the user plane function device 805 is configured to perform quality of service control or charging control on the user equipment based on the connection type.

In this embodiment, after identifying the connection type of the user equipment, the mobility management device notifies various other network devices (the policy control function device 803, the session management device 804, the user plane function device 805, or the like). The network devices may perform different control based on a function for which the network devices are responsible, to implement differentiated services for user equipments of different connection types.

Figure 9:
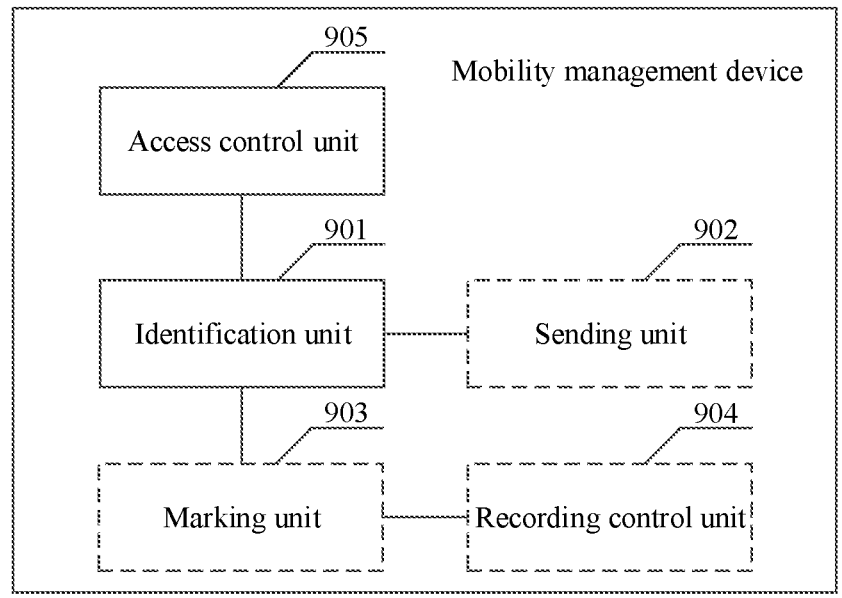
FIG. 9 is a schematic structural diagram of a mobility management device according to an embodiment of the present invention.

An embodiment of the present invention further provides a mobility management device. As shown in FIG. 9, the mobility management device includes:

an identification unit 901, configured to identify a connection type used by user equipment to access a core network through an access node device, where the connection type is single connectivity or dual connectivity; when the connection type is the single connectivity, the user equipment accesses the core network through one access node device; and when the connection type is the dual connectivity, the user equipment accesses the core network through two access node devices; and an access control unit 905, configured to perform access control on the user equipment based on the connection type of the user equipment.

In this embodiment, the mobility management device identifies the connection type of the user equipment, and an identification function may be aggregated in a fixed device.

In addition, the mobility management device is a core network device that the user equipment first accesses through the access node device. Therefore, if a targeted service, for example, access control is further performed on the mobility management device, compared with a case in which the mobility management device is notified of the connection type of the user equipment after another device identifies the connection type of the user equipment, this is more promptly and has a shorter delay.

For specific description of this embodiment, refer to the method embodiment provided in the first aspect, the description of the method procedures executed by the mobility management device in FIG. 3, FIG. 5, and FIG. 6, and the description of the method procedure executed by the access and mobility management function in FIG. 4. Details are not described herein again.

In a possible implementation, the identification unit 901 is configured to determine the connection type of the user equipment based on an access type parameter of the user equipment sent by the access node device, where the access type parameter is used to indicate a radio access type of the user equipment or a type of the access node device;

the identification unit 901 determines the connection type of the user equipment based on one or more of a dual-connectivity capability of the user equipment, subscription information of the user equipment, or a local configuration of the mobility management device;

the identification unit 901 receives a data usage report sent by the access node device, where the data usage report includes traffic information of the user equipment, and the mobility management device determines the connection type of the user equipment based on the data usage report; or the identification unit 901 receives a message carrying an internet protocol IP address of the access node device, and the identification unit 901 determines the connection type of the user equipment based on the IP address of the access node device.

In a possible implementation, that the identification unit 901 is configured to determine the connection type of the user equipment based on an access type parameter of the user equipment sent by the access node device includes: determining the connection type of the user equipment based on an access type parameter included in a radio access bearer update request message, a channel handover request message, or a service flow notification message sent by the access node device.

In a possible implementation, that the identification unit 901 is configured to receive a message carrying an internet protocol IP address of the access node device, and the identification unit 901 determines the connection type of the user equipment based on the IP address of the access node device includes: receiving an initial context setup response message, a packet data unit PDU session resource setup response message, or a default bearer setup response message, and carrying the IP address of the access node device in the initial context setup response message, the PDU session resource setup response message, or the default bearer setup response message; and determining the connection type of the user equipment based on the IP address of the access node device.

In a possible implementation, that the identification unit 901 is configured to determine the connection type of the user equipment based on one or more of a dual-connectivity capability of the user equipment, subscription information of the user equipment, or a local configuration of the mobility management device includes:

the identification unit 901 is configured to determine the connection type of the user equipment based on information that is about the dual-connectivity capability of the user equipment and that is sent by the user equipment;

the identification unit 901 is configured to determine the connection type of the user equipment based on the subscription information of the user equipment obtained from a home subscriber server of the user equipment; or the identification unit 901 is configured to determine the connection type of the user equipment based on information that is about whether the user equipment is allowed to establish the dual connectivity and that is included in the local configuration of the mobility management device.

In a possible implementation, that the identification unit 901 receives a data usage report sent by the access node device, where the data usage report includes traffic information of the user equipment, and the mobility management device determines the connection type of the user equipment based on the data usage report includes: The identification unit 901 is configured to: When determining that the data usage report sent by the access node device is received in a connected-state period of the user equipment, determine that the connection type of the user equipment is the dual connectivity. In another aspect, if determining that the data usage report sent by the access node device is not received in a connected-state period of the user equipment, the identification unit 901 determines that the connection type of the user equipment is the single connectivity.

In an optional implementation, the mobility management device further includes a marking unit 903, configured to distinguish the access node device as a first base station or a second base station based on the received IP address of the access node device.

The identification unit 901 is specifically configured to: when the access node device accessed by the user equipment includes the first base station and the second base station, determine that the connection type of the user equipment is the dual connectivity; and when the access node device accessed by the user equipment includes only the first base station, determine that the connection type of the user equipment is the single connectivity.

In a possible implementation, the marking unit 903 is configured to: when the user equipment is not allowed to establish the dual connectivity, mark, as the first base station, an access node device corresponding to the IP address of the access node device after receiving the IP address of the access node device; obtain the IP address of the access node device received in a procedure in which a service data packet forwarding channel is established in the first base station, and mark, as the first base station, the access node device corresponding to the IP address of the access node device; and when the user equipment accesses two IP addresses, and an access node device corresponding to one of the two IP addresses is the first base station, mark, as the second base station, an access node device corresponding to the other IP address of the two IP addresses.

In a possible implementation, the procedure in which the service data packet forwarding channel is first established in the first base station includes any one of a registration procedure, a tracking area update procedure, a service request procedure, and an attach procedure.

In an optional implementation, the mobility management device further includes a recording control unit 904, configured to: after a preset time point at which the marking unit 903 marks the access node device corresponding to the IP address as the first base station or the second base station, delete information about that the marked access node device corresponding to the IP address is the first base station or the second base station.

In an optional implementation, the mobility management device further includes a sending unit 902, configured to send the identified connection type to a gateway device.

In this embodiment, the identification unit 901 and other units except the sending unit 902 may be corresponding to related functions of a processor of the mobility management device in subsequent embodiments, and the sending unit 902 may be corresponding to related functions of a transceiver.

An embodiment of the present invention further provides a network device. The network device may be any one of a mobility management device, a gateway device, a policy control function device, a session management device, or a user plane function device.

Figure 10:
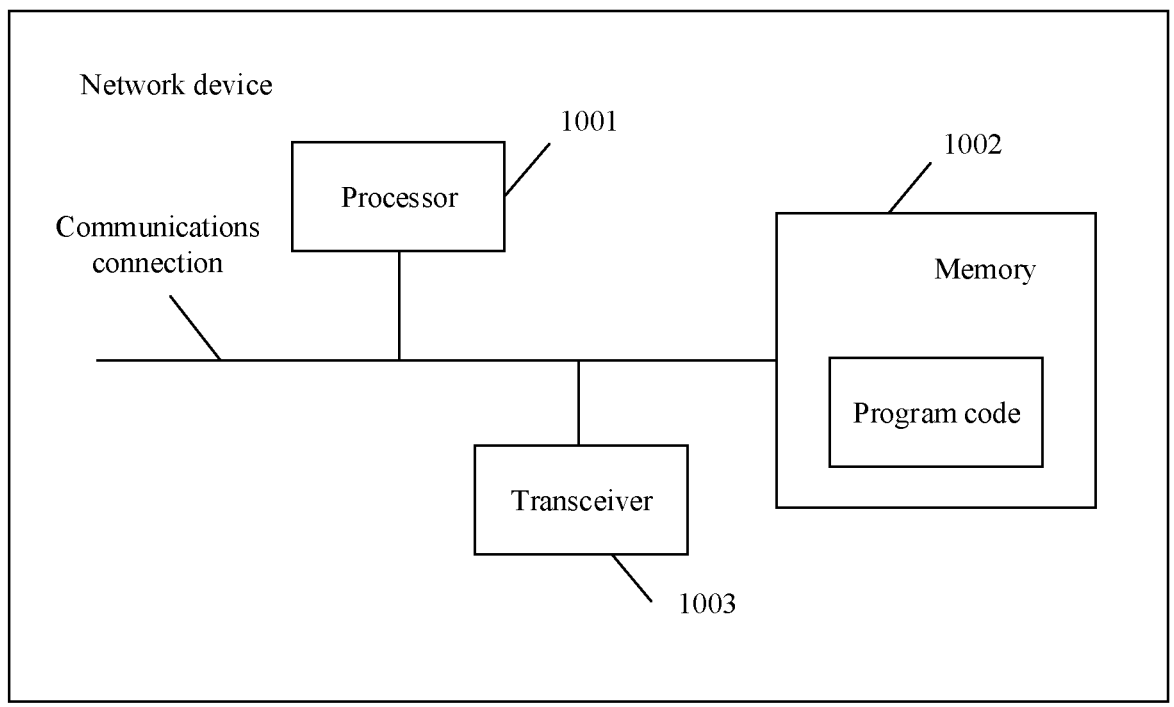
FIG. 10 is a schematic structural diagram of a network device according to an embodiment of the present invention.

As shown in FIG. 10, the network device includes a processor 1001, a memory 1002, and a transceiver 1003. The processor 1001, the memory 1002, and the transceiver 1003 are connected in a communicable manner.

The memory 1002 stores program code.

If the network device is the mobility management device, the processor 1001 is configured to read the program code and cooperate with the transceiver 1003 to implement the method procedure other than message receiving and sending performed by the gateway device in the embodiment provided in the first aspect of the embodiments of the present invention, more specifically, for example, the method procedures performed by the mobility management device in FIG. 3, FIG. 5, and FIG. 6, and the method procedure performed by the access and mobility management function in FIG. 4 are not described in detail herein again.

More specifically, the processor 1001 may be corresponding to functions of the identification unit 901, the marking unit 903, the recording control unit 904, and the access control unit 905 in the structure shown in FIG. 9. A specific execution process is not described in detail again in this embodiment. The transceiver 1003 may be corresponding to a function of the sending unit 902 in the structure shown in FIG. 9. A specific execution process is not described in detail again in this embodiment.

If the network device is a gateway device, a policy control function device, a session management device, or a user plane function device, the transceiver 1003 is configured to receive a connection type that is of user equipment and that is sent by a mobility management device. The processor 1001 is configured to perform a corresponding differentiated service for the user equipment based on the connection type of the user equipment. For example, the policy control function device delivers a quality of service policy or a charging control policy to the user equipment based on the connection type. The session management device performs quality of service control or charging control on the user equipment based on the connection type. The user plane function device performs quality of service control or charging control on the user equipment based on the connection type. The gateway device performs quality of service control or charging control on the user equipment based on a connection type.

The memory 1002 includes, but is not limited to, a random access memory (random access memory, RAM), a read-only memory (read-only memory, ROM), an erasable programmable read-only memory (erasable programmable read only memory, EPROM), or a compact read-only memory (compact disc read-only memory, CD-ROM). The memory 1002 is configured to store a related instruction and related data. The transceiver 1003 is configured to receive and send data and a message.

The processor 1001 may be one or more central processing units (central processing unit, CPU). When the processor 1001 is one CPU, the CPU may be a single-core CPU or a multi-core CPU.

An embodiment of the present invention further provides a computer storage medium. The storage medium stores program code. The program code includes program instructions. When the program instructions are executed by a processor, the processor and a transceiver cooperate to implement a function of any method in the embodiments of the present invention. For details, refer to the foregoing method procedure. Details are not described herein again.

An embodiment of the present invention further provides a computer program product. The computer program product includes program instructions. When the program instructions are executed by a processor, the processor and a transceiver cooperate to implement a function of any method in the embodiments of the present invention. For details, refer to the foregoing method procedure. Details are not described herein again.

A person of ordinary skill in the art may understand that all or some of the procedures of the methods in the embodiments may be implemented by a computer program instructing related hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disc.

What is claimed is:

1. A method for performing access control on user equipment, comprising:
    receiving, by a mobility management device of a core network from a first access node device connected to the user equipment, an access type parameter of the user equipment, wherein the access type parameter indicates a radio access type of the user equipment or a type of the first access node device currently used for the user equipment to access the core network;
    determining, by the mobility management device based on the access type parameter, a connection type of the user equipment in accessing the core network, wherein the connection type is single connectivity or dual connectivity, wherein when the connection type is single connectivity, the user equipment accesses the core network through the first access node device, and when the connection type is dual connectivity, the user equipment accesses the core network through the first access node device and a second access node device; and
    performing, by the mobility management device, access control on the user equipment based on the connection type of the user equipment.

2. The method according to claim 1, wherein the steps of receiving the access type parameter comprises:
    receiving, by the mobility management device from the first access node device, a radio access bearer update request message, a channel handover request message, or a service flow notification message, wherein the radio access bearer update request message, the channel handover request message, or the service flow notification message comprises the access type parameter.

3. The method according to claim 1, further comprising:
sending, by the mobility management device, the connection type to a gateway device.

4. The method according to claim 1, wherein the first access node device is a primary access node for the user equipment, and the step of determining the connection type comprises:
determining, by the mobility management device based on the access type parameter, whether a service data packet of the user equipment is forwarded through the first access node device or the second access node device as a secondary access node; and
in response that a service data packet corresponding to a bearer of the user equipment is forwarded by the second access node device, determining, by the mobility management device, that the connection type of the user equipment is the dual connectivity.

5. The method according to claim 1, wherein the first access node device is a primary access node for the user equipment, and the step of determining the connection type comprises:
determining, by the mobility management device based on the access type parameter, whether a service data packet of the user equipment is forwarded through the first access node device or the second access node device as a secondary access node; and
in response that service data packets corresponding to all bearers of the user equipment are forwarded by the first access node device, determining, by the mobility management device, that the connection type of the user equipment is the single connectivity.

6. The method according to claim 1, further comprising:
determining, by the first access node device, the access type parameter of the user equipment, and
sending, by the first access node device, the access type parameter of the user equipment to the mobility management device.

7. The method according to claim 6, wherein the step of sending the access type parameter of the user equipment to the mobility management device comprises:
sending, by the first access node device, a radio access bearer update request message, a channel handover request message, or a service flow notification message to the mobility management device, wherein the radio access bearer update request message, the channel handover request message, or the service flow notification message comprises the access type parameter.

8. The method according to claim 1, wherein the step of performing access control on the user equipment comprises:
when the user equipment has dual-connectivity capability or has subscribed to dual connectivity and is currently using single connectivity, performing, by the mobility management device, access control on the user equipment such that the user equipment cannot use service data; or
separately counting, by the mobility management device, a quantity of single-connectivity user equipment devices and a quantity of dual-connectivity user equipment devices; and
when the quantity of single-connectivity user equipment devices or the quantity of dual-connectivity user equipment devices exceeds a value purchased under a license, generating, by the mobility management device, an alarm or restricts access of new user equipment devices.

9. A mobility management device of a core network, comprising:
a memory storing executable instructions;
a processor configured to execute the executable instructions to:
receive, from a first access node device connected to the user equipment, an access type parameter of the user equipment, wherein the access type parameter indicates a radio access type of the user equipment or a type of the first access node device currently used for the user equipment to access the core network;
determine a connection type of the user equipment in accessing a core network based on the access type parameter, wherein the connection type is single connectivity or dual connectivity, when the connection type is single connectivity, the user equipment accesses the core network through the first access node device, and when the connection type is the dual connectivity, the user equipment accesses the core network through the first access node device and a second access node device; and
perform access control on the user equipment based on the connection type of the user equipment.

10. The mobility management device according to claim 9, wherein processor is configured to receive the access type parameter of the user equipment from the first access node device by:
receiving a radio access bearer update request message, a channel handover request message, or a service flow notification message sent by the first access node device, wherein the radio access bearer update request message, the channel handover request message, or the service flow notification message comprises the access type parameter.

11. The mobility management device according to the claim 9, wherein the first access node device is a primary access node for the user equipment, and the processor is configured to determine the connection type of the user equipment based on the access type parameter by:
determining, based on the access type parameter, whether a service data packet of the user equipment is forwarded through the first access node device or the second access node device as a secondary access node; and
in response that a service data packet corresponding to a bearer of the user equipment is forwarded by the second access node device, determining that the connection type of the user equipment is the dual connectivity.

12. The mobility management device according to the claim 9, wherein the first access node device is a primary access node for the user equipment, and the processor is configured to determine the connection type of the user equipment based on the access type parameter by:
determining, based on the access type parameter, whether a service data packet of the user equipment is forwarded through the first access node or the second access node as a secondary access node; and
in response that service data packets corresponding to all bearers of the user equipment are forwarded by the first access node, determining that the connection type of the user equipment is the single connectivity.

13. The mobility management device according to claim 9, wherein the processor is further configured to execute the executable instructions to:
send the connection type to a gateway device.

14. The mobility management device according to claim 9, wherein the processor is configured to perform access control on the user equipment by:
  when the user equipment has dual-connectivity capability or has subscribed to dual connectivity and is currently using the single connectivity, performing access control on the user equipment such that the user equipment cannot use service data; or
  separately counting a quantity of single-connectivity user equipment devices and a quantity of dual-connectivity user equipment devices; and
  when the quantity of single-connectivity user equipment devices or the quantity of dual-connectivity user equipment devices exceeds a value purchased under a license, generating an alarm or restricts access of new user equipment devices.

15. A network system, comprising:
  a first access node device connected to user equipment; and
  a mobility management device,
  wherein the first access node device is configured to:
    determine an access type parameter of the user equipment, wherein the access type parameter indicates a radio access type of the user equipment or a type of the first access node device currently used by the user equipment to access a core network of the network system; and
    send the access type parameter of the user equipment to the mobility management device;
  and wherein the mobility management device is configured to:
    receive, from the first access node device, the access type parameter of the user equipment;
    determine, based on the access type parameter, a connection type of the user equipment in accessing the core network, wherein the connection type is single connectivity or dual connectivity, when the connection type is the single connectivity, the user equipment accesses the core network through the first access node device, and when the connection type is the dual connectivity, the user equipment accesses the core network through the first access node device and a second access node device; and
    perform access control on the user equipment based on the connection type of the user equipment.

16. The network system according to the claim 15, wherein the mobility management device is configured to receive from the first access node device the access type parameter of the user equipment by:
  receiving a radio access bearer update request message, a channel handover request message, or a service flow notification message sent by the first access node device, wherein the radio access bearer update request message, the channel handover request message, or the service flow notification message comprises the access type parameter.

17. The network system according to the claim 15, wherein the first access node device is a primary access node for the user equipment, and the mobility management device is configured to determine the connection type of the user equipment based on the access type parameter by:
  determining, based on the access type parameter, whether a service data packet of the user equipment is forwarded through the first access node device or the second access node device as a secondary access node; and
  in response that a service data packet corresponding to a bearer of the user equipment is forwarded by the second access node device, determining that the connection type of the user equipment is the dual connectivity.

18. The network system according to the claim 15, wherein the first access node device is a primary access node for the user equipment, and the mobility management device is configured to determine the connection type of the user equipment based on the access type parameter by:
  determining, based on the access type parameter, whether a service data packet of the user equipment is forwarded through the first access node device or the second access node device as a secondary access node; and
  in response that service data packets corresponding to all bearers of the user equipment are forwarded by the first access node device, determining that the connection type of the user equipment is the single connectivity.

19. The network system according to the claim 15, further comprising a gateway device, wherein the mobility management device is further configured to:
  send the connection type to the gateway device, and the gateway device is configured to:
  receive the connection type from the mobility management device.

20. The network system according to the claim 15, wherein the first access node device is configured to send the access type parameter of the user equipment to the mobility management device by:
  sending a radio access bearer update request message, a channel handover request message, or a service flow notification message to the mobility management device, wherein the radio access bearer update request message, the channel handover request message, or the service flow notification message comprises the access type parameter.

21. The network system according to claim 15, wherein the mobility management device is configured to perform access control on the user equipment by:
  when the user equipment has dual-connectivity capability or has subscribed to dual connectivity and is currently using the single connectivity, performing access control on the user equipment such that the user equipment cannot use service data; or
  separately counting a quantity of single-connectivity user equipment devices and a quantity of dual-connectivity user equipment devices; and
  when the quantity of single-connectivity user equipment devices or the quantity of dual-connectivity user equipment devices exceeds a value purchased under a license, generating an alarm or restricts access of new user equipment devices.

* * * * *